(12) United States Patent
Yamasaki et al.

(10) Patent No.: US 8,300,513 B2
(45) Date of Patent: Oct. 30, 2012

(54) OPTICAL HEAD, OPTICAL HEAD MANUFACTURING METHOD AND OPTICAL DISC DEVICE

(75) Inventors: Fumitomo Yamasaki, Nara (JP); Yoshiaki Komma, Osaka (JP); Kanji Wakabayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 552 days.

(21) Appl. No.: 12/238,888

(22) Filed: Sep. 26, 2008

(65) Prior Publication Data

US 2009/0080298 A1    Mar. 26, 2009

(30) Foreign Application Priority Data

Sep. 26, 2007  (JP) ................................ 2007-248637
Sep. 22, 2008  (JP) ................................ 2008-242836

(51) Int. Cl.
*G11B 7/00* (2006.01)
(52) U.S. Cl. ................ 369/112.08; 369/44.23
(58) Field of Classification Search .............. None
See application file for complete search history.

(56) References Cited

U.S. PATENT DOCUMENTS

| | | | |
|---|---|---|---|
| 2001/0043549 A1 | 11/2001 | Maruyama et al. | |
| 2002/0006087 A1 | 1/2002 | Matsuda | |
| 2004/0070848 A1 | 4/2004 | Furuhata et al. | |
| 2004/0264859 A1* | 12/2004 | Nagashima | 385/37 |
| 2005/0207028 A1* | 9/2005 | Hendriks et al. | 359/708 |
| 2005/0243674 A1* | 11/2005 | Hirai | 369/53.23 |
| 2005/0249097 A1* | 11/2005 | Hashimura et al. | 369/112.01 |
| 2008/0089194 A1* | 4/2008 | Matsuzaki et al. | 369/44.32 |

FOREIGN PATENT DOCUMENTS

| | | |
|---|---|---|
| JP | 2001-297476 | 10/2001 |
| JP | 2002-83434 | 3/2002 |
| JP | 2002-304764 | 10/2002 |
| JP | 2004-133958 | 4/2004 |
| JP | 2005-259231 | 9/2005 |
| JP | 2005-327826 | 11/2005 |
| JP | 2005-339771 | 12/2005 |
| JP | 2006-059471 | 3/2006 |
| JP | 2007-66442 | 3/2007 |

* cited by examiner

*Primary Examiner* — Mohammad Ghayour
*Assistant Examiner* — Carl Adams
(74) *Attorney, Agent, or Firm* — Wenderoth Lind & Ponack, L.L.P.

(57) ABSTRACT

It is aimed to provide an optical head, an optical head manufacturing method and an optical disc device capable of correcting coma aberration generated due to different positions of emission points of a plurality of laser lights having different wavelengths.
A two-wavelength laser light source 1 is arranged to correct coma aberration generated in a radial direction of a CD 80 in the case where an objective lens 6 is tilted to locate an inner peripheral end of the objective lens 6 in the radial direction of the CD 80 lower than an outer peripheral end thereof, and an objective lens actuator 9 tilts the objective lens 6 to locate the inner peripheral end of the objective lens 6 in the radial direction of the CD 80 lower than the outer peripheral end thereof.

28 Claims, 25 Drawing Sheets

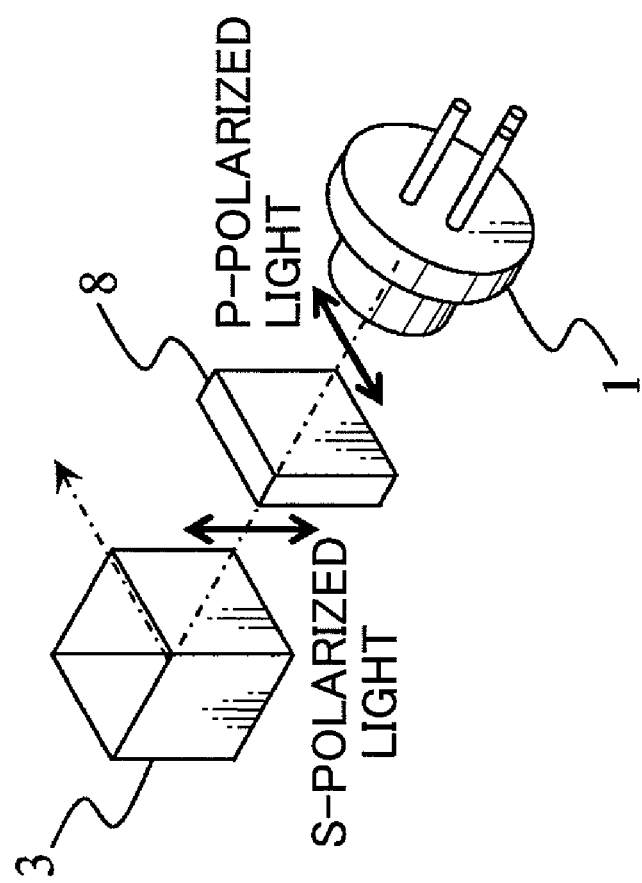
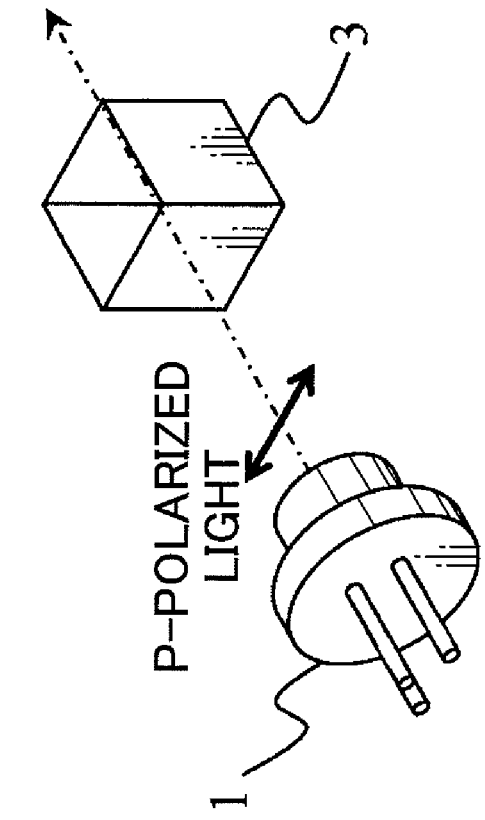

OPTICAL HEAD, OPTICAL HEAD MANUFACTURING METHOD AND OPTICAL DISC DEVICE

BACKGROUND OF THE INVENTION

1. Field of the Invention

The present invention relates to an optical head for optically recording or reproducing information on or from a plurality of types of information recording media, a method for manufacturing this optical head and an optical disc device provided with this optical head.

2. Description of the Background Art

In recent years, with the practical use of blue-violet semiconductor lasers, Blu-ray discs (hereinafter, "BDs"), which are high-density and high-capacity optical information recording media (hereinafter, also referred to as "optical discs") having the same size as CDs (compact discs) and DVDs (digital versatile discs), have been put to practical use. This BD is an optical disc which has a protective substrate thickness of about 0.1 mm and on or from which information is recorded or reproduced using a blue-violet laser light source having a wavelength of about 400 nm and an objective lens with a numerical aperture (NA) increased up to 0.85.

CDs, DVDs and BDs differ in protective substrate thicknesses. Accordingly, there has been proposed a compatible optical head for recording or reproducing information by focusing laser lights of different wavelengths on information recording layers of the optical discs having different protective substrate thicknesses using one objective lens.

Here is described an optical head for recording or reproducing information, for example, on or from a CD having a protective substrate thickness of 1.2 mm and a DVD having a protective substrate thickness of 0.6 mm by focusing an infrared laser light and a red laser light using one objective lens. FIG. 29 is a schematic diagram of a conventional optical head.

In FIG. 29, an optical head 130 is provided with a red laser light source 101, an infrared laser light source 111, diffraction gratings 102, 112, a dichroic prism 113, a beam splitter 103, a collimator lens 104, a mirror 105, an objective lens 106, an anomorphic lens 107, an objective lens actuator 109 and a light receiving element 110. Further, a DVD 70 is an optical disc having a protective substrate thickness of 0.6 mm and a CD 80 is an optical disc having a protective substrate thickness of 1.2 mm.

First of all, the operation of the optical head 130 in the case of recording or reproducing information on or from the DVD 70 is described. A red laser light having a wavelength of 655 nm and emitted from the red laser light source 101 is separated into a main beam as a $0^{th}$-order light and a sub beam as $\pm 1^{st}$-order lights by the diffraction grating 102. The main beam and the sub beam pass through the dichroic prism 113 and the beam splitter 103, are converted into substantially parallel lights by the collimator lens 104 and are bent by being reflected in a direction toward the DVD 70 by the mirror 105. The two beams reflected by the mirror 105 are focused as light spots on an information recording layer of the DVD 70 through a protective substrate by the objective lens 106. The main beam and sub beam reflected by the information recording layer of the DVD 70 pass through the objective lens 106 again and are reflected by the mirror 105 to pass through the collimator lens 104. The two beams having passed through the collimator lens 104 are reflected by the beam splitter 103 and pass through the anomorphic lens 107 and pass through the anomorphic lens 107 to be introduced to the light receiving element 110. The light receiving element 110 generates an information signal and a servo signal using the received main beam and sub beam.

Next, the operation of the optical head 130 in the case of recording or reproducing information on or from the CD 80 is described. An infrared laser light having a wavelength of 785 nm and emitted from the infrared laser light source 111 is separated into a main beam as a $0^{th}$-order light and a sub beam as $\pm 1^{st}$-order lights by the diffraction grating 112. The main beam and the sub beam are reflected by the dichroic prism 113, passes through the beam splitter 103, are converted into substantially parallel lights by the collimator lens 104 and are bent by being reflected in a direction toward the CD 80 by the mirror 105. The two beams reflected by the mirror 105 are focused as light spots on an information recording layer of the CD 80 through a protective substrate by the objective lens 106. The main beam and sub beam reflected by the information recording layer of the CD 80 pass through the objective lens 106 again and are reflected by the mirror 105 to pass through the collimator lens 104. The two beams having passed through the collimator lens 104 are reflected by the beam splitter 103 and pass through the anomorphic lens 107 to be introduced to the light receiving element 110. The light receiving element 110 generates an information signal and a servo signal using the received main beam and sub beam.

A focus error signal used to record or reproduce information on or from the DVD 70 and the CD 80 is detected using an astigmatism method or the like by the anomorphic lens 107. A tracking error signal is detected using a so-called three-beam method or differential push-pull method (DPP method) or the like using the main beam and sub beam generated by the diffraction grating 102 or the diffraction grating 112.

The objective lens 106 has a diffraction structure for focusing a red laser light for recording or reproducing information on or from the DVD 70 and an infrared laser light for recording or reproducing information on or from the CD 80 as very small light spots utilizing a wavelength difference.

Accordingly, by using such an optical head 130, laser lights having different wavelengths can be focused on different types of optical discs using one objective lens 106 to record or reproduce information.

In this way, in the optical head for focusing laser lights having different wavelengths on different types of optical discs using one objective lens, a coma aberration amount generated by the tilt of the objective lens, i.e. so-called lens tilt differs depending on the wavelength of a laser light. Thus, if a skew adjustment (tilt adjustment) of the objective lens 106 is, for example, performed to minimize the coma aberration for the DVD 70, the coma aberration for the CD 80 may not be minimized in some cases.

To deal with such cases, a construction for performing a skew adjustment of an objective lens to attain a tilt angle optimal for recording or reproduction on or from an optical disc (e.g. DVD) of a specified specification and changing the tilt of the objective lens (lens tilt) by a predetermined angle with respect to the optimal tilt angle in the case of using an optical disc of another specification (e.g. CD) is disclosed, for example, in an optical disc device of Japanese Unexamined Patent Publication No. 2007-66442.

FIG. 30 is a diagram showing emission points of a monolithic two-wavelength laser light source for emitting a red laser light and an infrared laser light. An emission point 131a for emitting a red laser light and an emission point 131b for emitting an infrared laser light in a monolithic two-wavelength laser light source 131 are arranged at a specified distance δ from each other. The monolithic two-wavelength laser light source 131 has such a structure that, for example, a GaAs substrate is arranged on a submount 82, and the red and infrared laser lights are emitted from one laser chip. The two-wavelength laser light source can be of the hybrid type including two laser chips arranged side by side besides being of the monolithic type as shown in FIG. 30. In either type, the emission point for red laser light and the emission point for infrared laser light cannot be generally matched.

Accordingly, if the optical axis of an objective lens and that of the red laser light emitted from the two-wavelength laser light source are matched, the optical axis of the objective lens and that of the infrared laser light emitted from the two-wavelength laser light source cannot be matched. In other words, in this case, the infrared laser light is incident off-axis on the objective lens and coma aberration occurs in the objective lens not satisfying a sine condition.

Although the construction of the optical disc device for correcting coma aberration remaining after the skew adjustment of the objective lens is disclosed in Japanese Unexamined Patent Publication No. 2007-66442, coma aberration generated due to the above displacement of the emission points is not mentioned at all.

SUMMARY OF THE INVENTION

In order to solve the above problem, an object of the present invention is to provide an optical head, an optical head manufacturing method and an optical disc device capable of correcting coma aberration generated due to different positions of emission points of a plurality of laser lights having different wavelengths.

One aspect of the present invention is directed to an optical head, comprising a light source for emitting a first laser light having a first wavelength and a second laser light having a second wavelength different form the first wavelength; an objective lens for focusing the first laser light on an information recording layer of a first information recording medium and focusing the second laser light on an information recording layer of a second information recording medium different from the first information recording medium; and an objective lens driver for tilting the objective lens in a direction to decrease coma aberration generated by the incidence of the first laser light oblique to the optical axis of the objective lens when the objective lens focuses the first laser light on the information recording layer of the first information recording medium, wherein the light source is arranged to correct the coma aberration generated in a radial direction of the first information recording medium when the objective lens is tilted to locate an inner peripheral end thereof in the radial direction of the first information recording medium lower than an outer peripheral end thereof; and the objective lens driver tilts the objective lens to locate the inner peripheral end of the objective lens in the radial direction of the first information recording medium lower than the outer peripheral end thereof.

These and other objects, features, aspects and advantages of the present invention will become more apparent upon a reading of the following detailed description with reference to accompanying drawings.

BRIEF DESCRIPTION OF THE DRAWINGS

FIG. 15A is a diagram showing a polarization direction of a laser light in the case of transmitting the laser light incident on a beam splitter, and FIG. 15B is a diagram showing a polarization direction of a laser light in the case of reflecting the laser light incident on the beam splitter.

DETAILED DESCRIPTION OF THE INVENTION

With reference to the accompanying drawings, embodiments of optical heads, an optical disc device, a computer, an optical disc player and an optical disc recorder according to the present invention are described. It should be appreciated that the following embodiments are merely specific examples of the present invention and are not of the nature to limit the technical scope of the present invention.

First Embodiment

Figure 1:
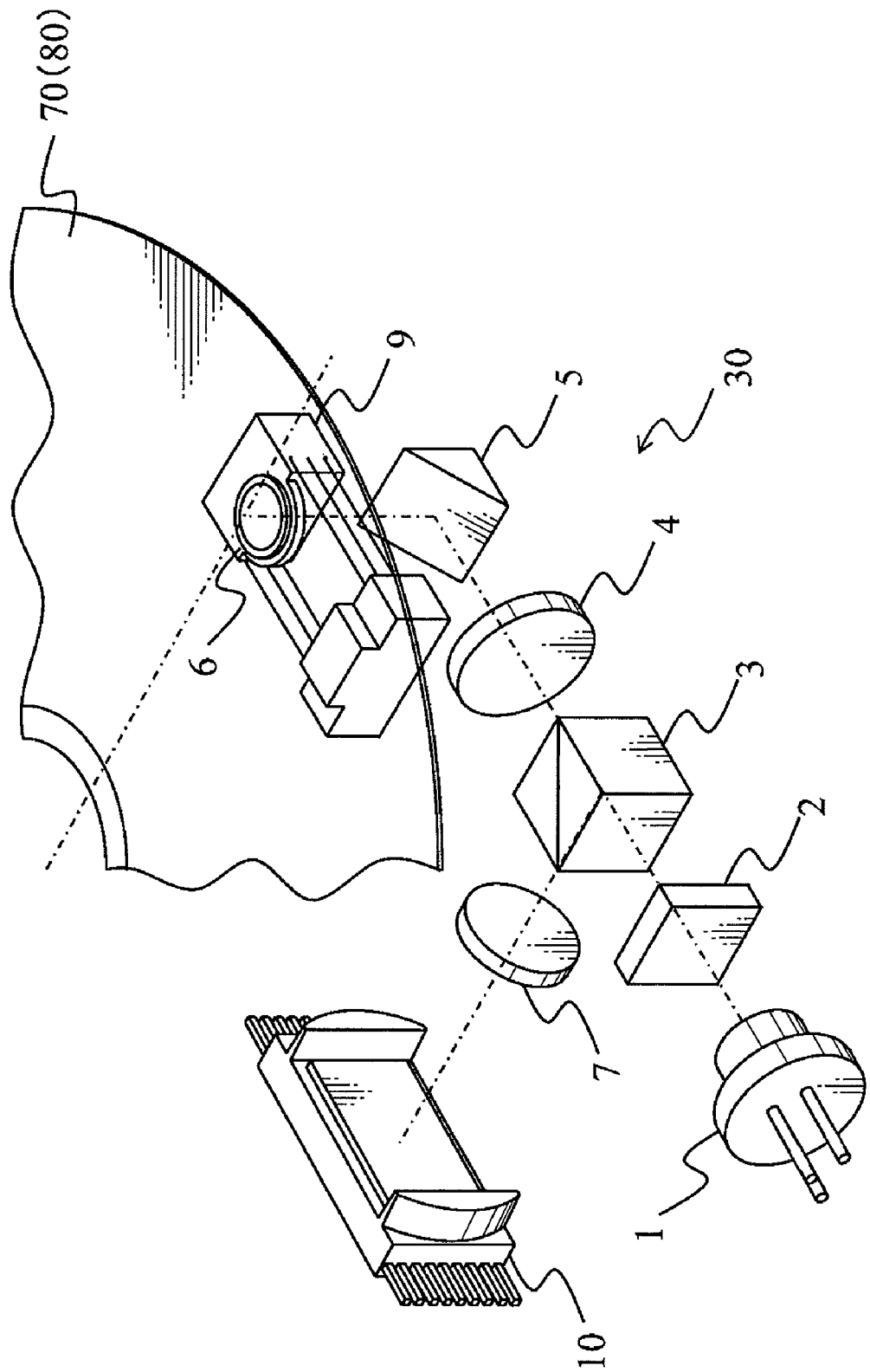
FIG. 1 is a schematic construction diagram of an optical head according to a first embodiment of the invention.

FIG. 1 is a schematic construction diagram of an optical head according to a first embodiment of the present invention.

In FIG. 1, an optical head 30 is provided with a two-wavelength laser light source 1, a diffraction grating 2, a beam splitter 3, a collimator lens 4, a mirror 5, an objective lens 6, an anomorphic lens 7, an objective lens actuator 9 and a light receiving element 10. The two-wavelength laser light source 1 emits a red laser light and an infrared laser light. Further, a DVD 70 is an optical disc having a protective substrate thickness of 0.6 mm and a CD 80 is an optical disc having a protective substrate thickness of 1.2 mm.

The operation of the optical head 30 in the case of recording or reproducing information on or from the DVD 70 or CD 80 is described. A red laser light having a wavelength of 655 nm or an infrared laser light having a wavelength of 785 nm, which is emitted from the two-wavelength laser light source 1, is separated into a main beam as a $0^{th}$-order light and a sub beam as $\pm 1^{st}$-order lights by the diffraction grating 2. The main beam and the sub beam pass through the beam splitter 3, are converted into substantially parallel lights by the collimator lens 4 and are bent by being reflected in a direction toward the DVD 70 or the CD 80 by the mirror 5. The two beams reflected by the mirror 5 are focused as light spots on an information recording layer of the DVD 70 or CD 80 through a protective substrate by the objective lens 6.

The main beam and sub beam reflected by the information recording layer of the DVD 70 or CD 80 pass through the objective lens 6 again, and pass through the collimator lens 4 after being reflected by the mirror 5. The two beams having passed through the collimator lens 4 are reflected by the beam splitter 3 and pass through the anomorphic lens 7 to be introduced to the light receiving element 10. The light receiving element 10 generates an information signal and a servo signal using the received main beam and sub beam.

A focus error signal used to record or reproduce information on or from the DVD 70 and the CD 80 is detected using an astigmatism method or the like by the anomorphic lens 7. A tracking error signal is detected using a so-called three-beam method or differential push-pull method (DPP method) or the like using the main beam and sub beam generated by the diffraction grating 2.

In this embodiment, the two-wavelength laser light source 1 corresponds to an example of a light source, the objective lens actuator 9 to an example of an objective lens driver, the infrared laser light to an example of a first laser light, the red laser light to an example of a second laser light, the CD 80 to an example of a first information recording medium and the DVD 70 to an example of a second information recording medium.

Figure 2:
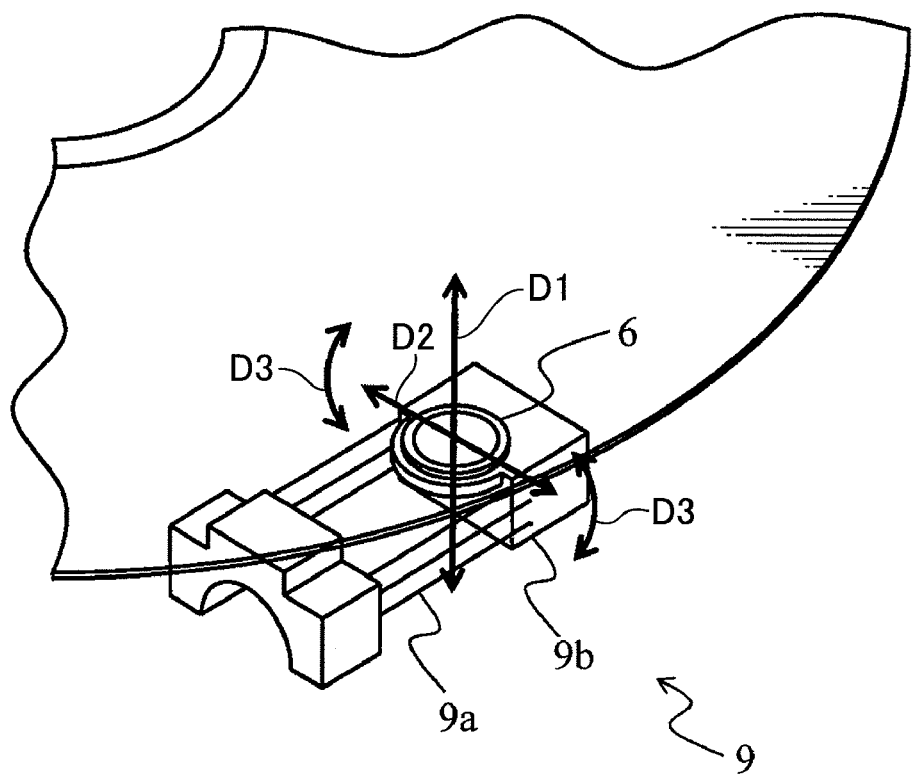
FIG. 2 is a diagram showing the operation of an objective lens actuator.

FIG. 2 is a diagram showing the operation of the objective lens actuator. The objective lens actuator 9 is constructed to support an objective lens holder 9b (movable part) by a plurality of suspension wires 9a as shown in FIG. 2. The objective lens 6 is fixed to the objective lens holder 9b. The objective lens actuator 9 includes an unillustrated coil so as to displace the objective lens 6 in a focusing direction D1 and a tracking direction D2 and to tilt the objective lens 6 in radial directions D3 of an optical disc by applying power to the coil.

The objective lens 6 focuses the infrared laser light on the information recording layer of the CD 80 while focusing the red laser light on the information recording layer of the DVD 70. The objective lens 9 tilts the objective lens 6 in a direction to decrease coma aberration generated by the incidence of the infrared laser light oblique to the optical axis of the objective lens 6 when the objective lens 6 focuses the infrared laser light on the information recording layer of the CD 80.

The objective lens actuator 9 drives the objective lens 6 in the focusing direction D1 and the tracking direction D2 in accordance with a focus error signal and a tracking error signal such that a light spot follows an information track of the rotating optical disc. Further, the objective lens actuator 9 can tilt the objective lens 6 in the radial directions D3 of the optical disc in addition to being able to displace it in the focusing direction D1 and the tracking direction D2.

The objective lens 6 has a diffraction structure for focusing a red laser light for recording or reproducing information on or from the DVD 70 or an infrared laser light for recording or reproducing information on or from the CD 80 as a very small light spot, utilizing a wavelength difference. The objective lens 6 is not limited to the one having such a diffraction structure, and may be a refractive objective lens utilizing wavelength dispersion characteristics of a plurality of glass materials or a combination lens obtained by combining a plurality of diffractive/refractive lenses.

As described above, the optical head 30 of this embodiment can record or reproduce information by focusing laser lights having different wavelengths on different types of optical discs, e.g. the DVD 70 and CD 80 using one objective lens 6.

Figure 3:
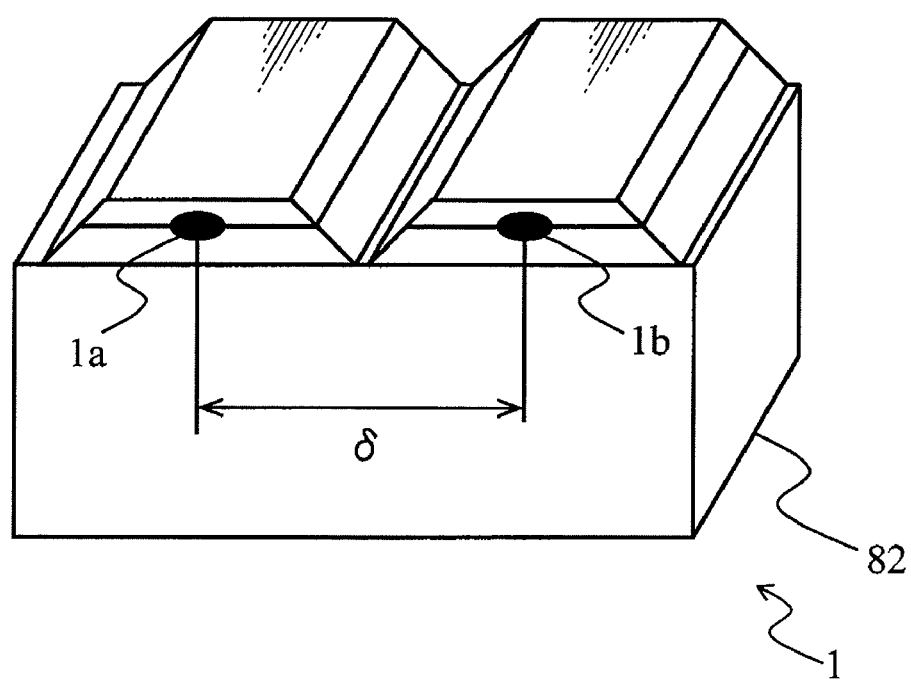
FIG. 3 is a diagram showing a state of emission points of a monolithic two-wavelength laser light source.

The two-wavelength laser light source 1 of this embodiment is a monolithic two-wavelength laser light source. FIG. 3 is a diagram showing a state of emission points of the monolithic two-wavelength laser light source. The two-wavelength laser light source 1 has such a construction that, for example, a GaAs substrate is arranged on a submount 82, and red and infrared laser lights are emitted from one laser chip. An emission point 1a for emitting a red laser light and an emission point 1b for emitting an infrared laser light are arranged at a specified distance δ from each other.

Figure 4:
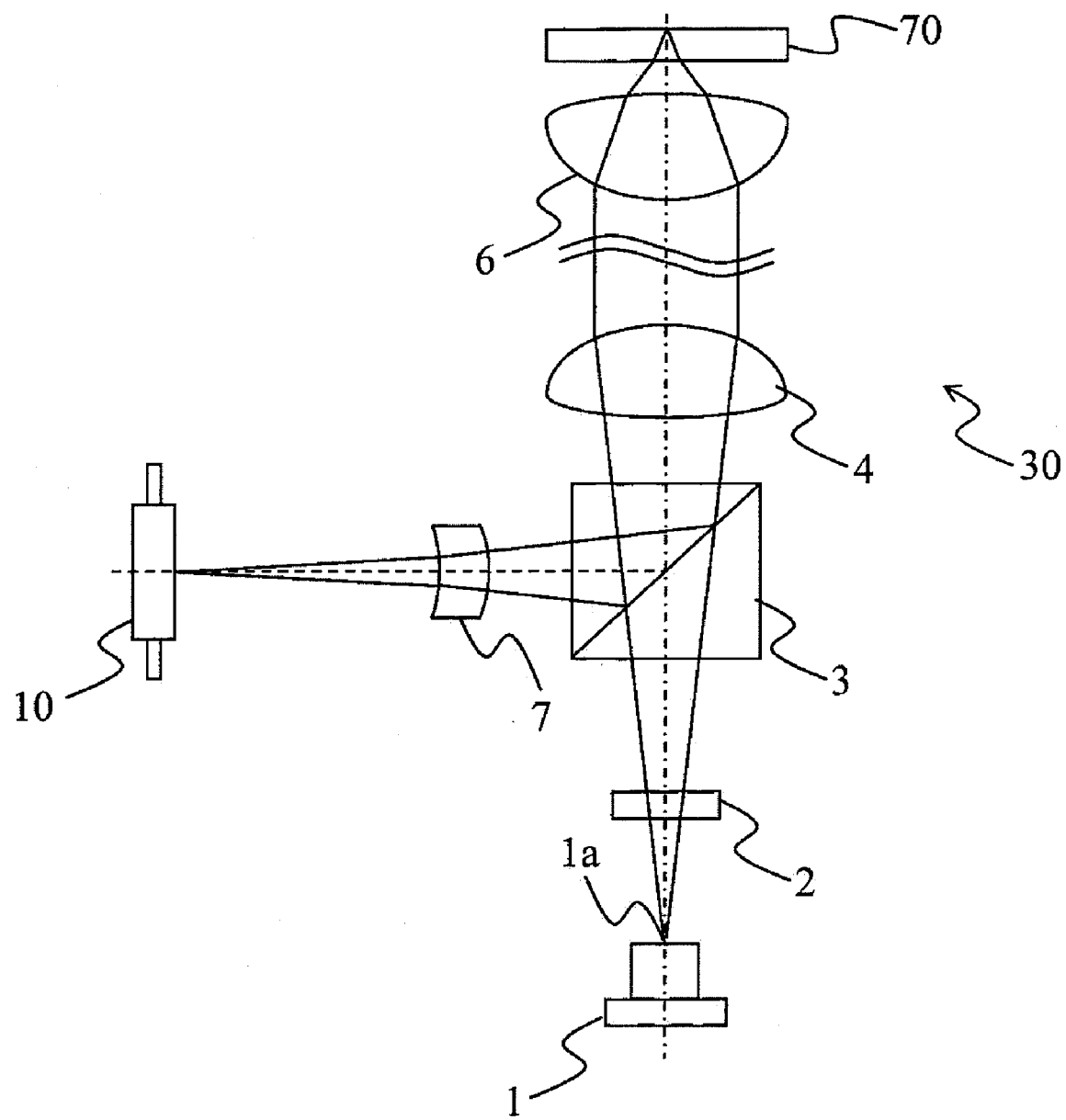
FIG. 4 is a diagram showing a state where a red laser light is focused on a DVD in the first embodiment of the invention.
Figure 5:
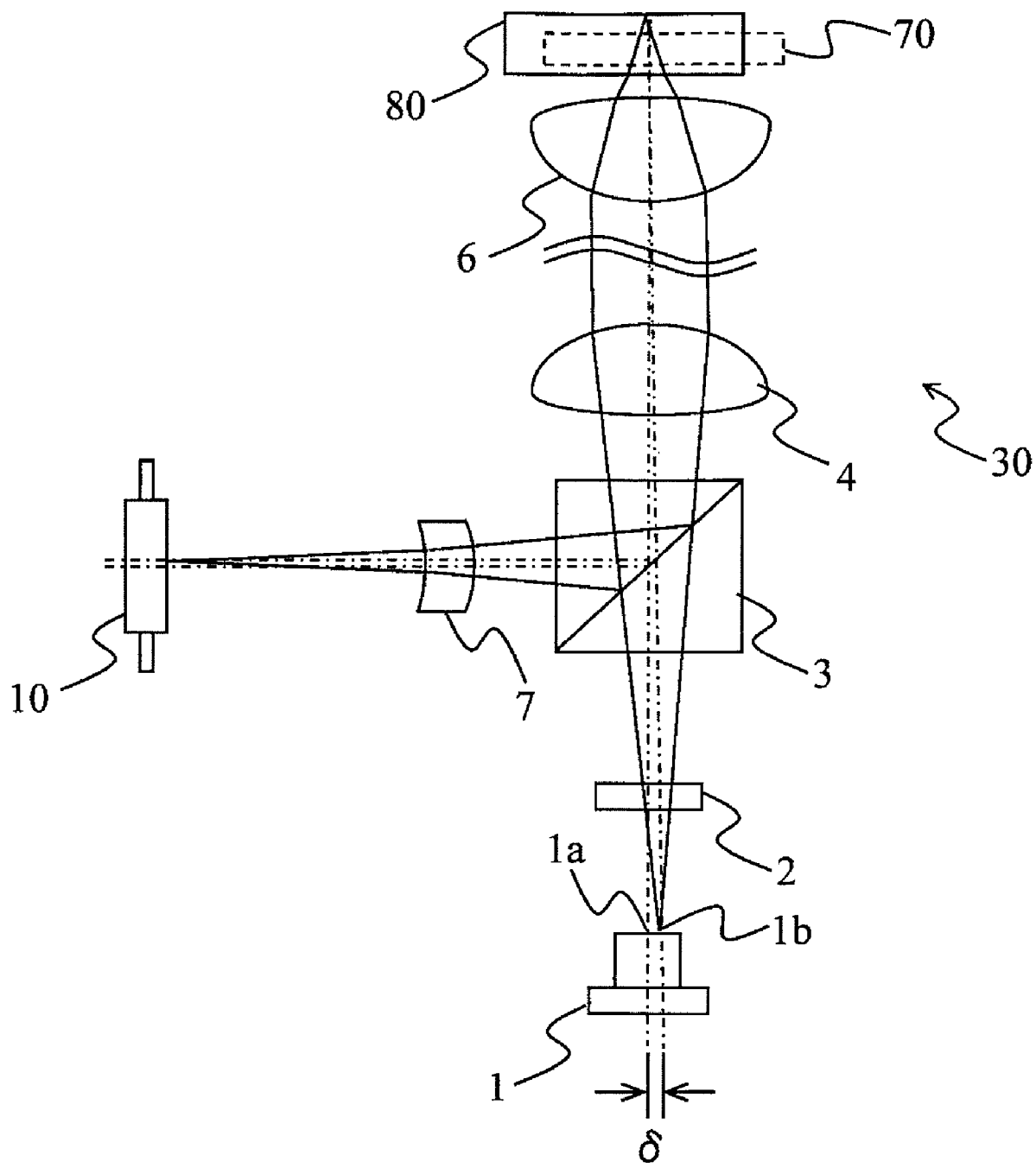
FIG. 5 is a diagram showing a state where an infrared laser light is focused on a CD in the first embodiment of the invention.

FIG. 4 is a diagram showing a state where a red laser light emitted from the emission point 1a is focused on the DVD 70 in the first embodiment of the present invention, and FIG. 5 is a diagram showing a state where an infrared laser light emitted from the emission point 1b is focused on the CD 80 in the first embodiment of the present invention. If the two-wavelength laser light source 1 is arranged such that the optical axis of the objective lens 6 coincides with that of the red laser light emitted from the two-wavelength laser light source 1 as shown in FIG. 4, the optical axis of the objective lens 6 and that of the infrared laser light emitted from the two-wavelength laser light source 1 cannot coincide as shown in FIG. 5. In other words, the infrared laser light is incident off-axis on the objective lens 6 and causes coma aberration if the objective lens 6 does not satisfy a sine condition.

Figure 6:
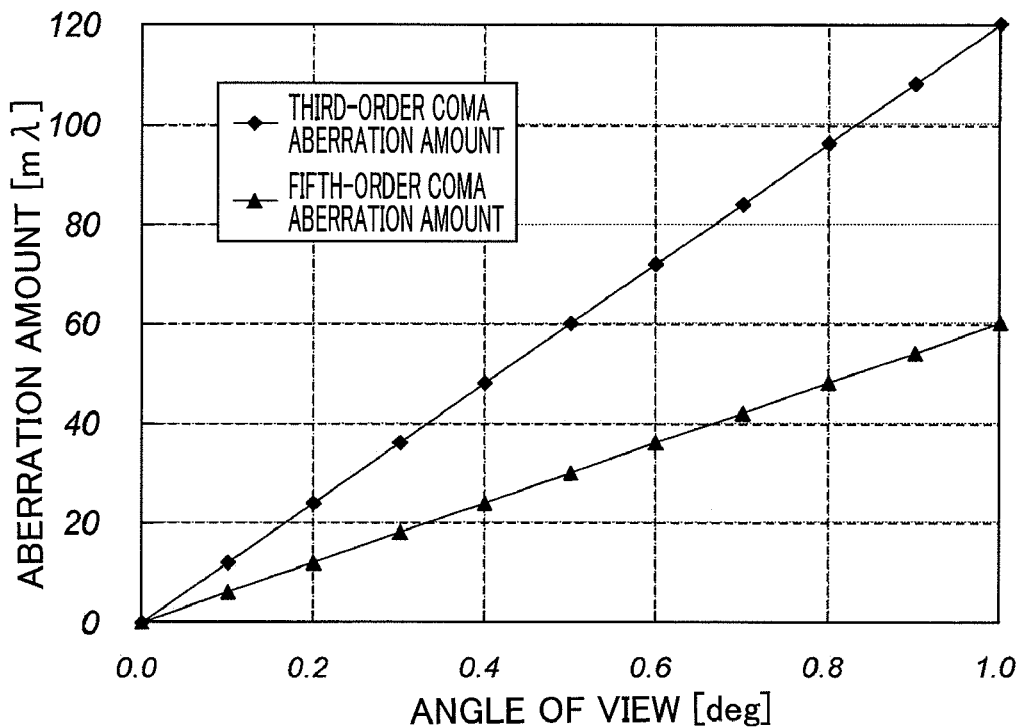
FIG. 6 is a graph showing a relationship of angle of view and coma aberrations at the time of recording or reproducing information on or from a CD in the first embodiment of the invention.

FIG. 6 is a graph showing a relationship of angle of view and a third-order coma aberration amount and a fifth-order coma aberration amount at the time of recording or reproducing information on or from the CD 80. In FIG. 6, a horizontal axis represents angle of view and a vertical axis represents the third-order and fifth-order coma aberration amounts. Rhombic points indicate the third-order coma aberration amount, and triangular points indicate the fifth-order coma aberration amount. Since the objective lens 6 of this embodiment does not satisfy the sine condition, third-order coma aberration of 72.0 mλ and fifth-order coma aberration of 36.0 mλ are generated for an angle of view of 0.6° as shown in FIG. 6. It should be noted that spherical aberrations and astigmatisms generated at the time of off-axis incidence are sufficient small, including higher-order ones.

Figure 7:
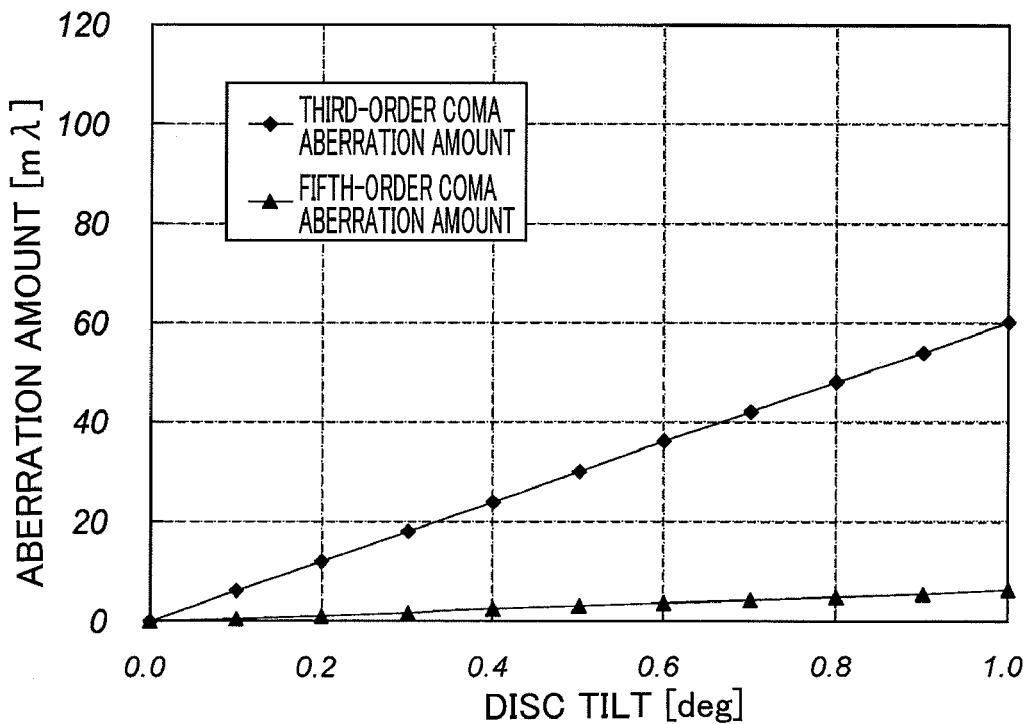
FIG. 7 is a graph showing a relationship of disc tilt and coma aberrations at the time of recording or reproducing information on or from the CD in the first embodiment of the invention.

FIG. 7 is a graph showing a relationship of the tilt of an optical disc (disc tilt) and generated third-order and fifth-order coma aberration amounts at the time of recording or reproducing information on or from the CD 80. In FIG. 7, a horizontal axis represents the tilt of the optical disc (disc tilt) and a vertical axis represents the third-order and fifth-order coma aberration amounts. Rhombic points indicate the third-order coma aberration amount, and triangular points indicate the fifth-order coma aberration amount. The coma aberrations generated by the tilt of the CD 80 by 0.6° do not depend on the design of the objective lens 6, and the third-order coma aberration is 36.0 mλ and the fifth-order coma aberration is 3.6 mλ.

Figure 8:
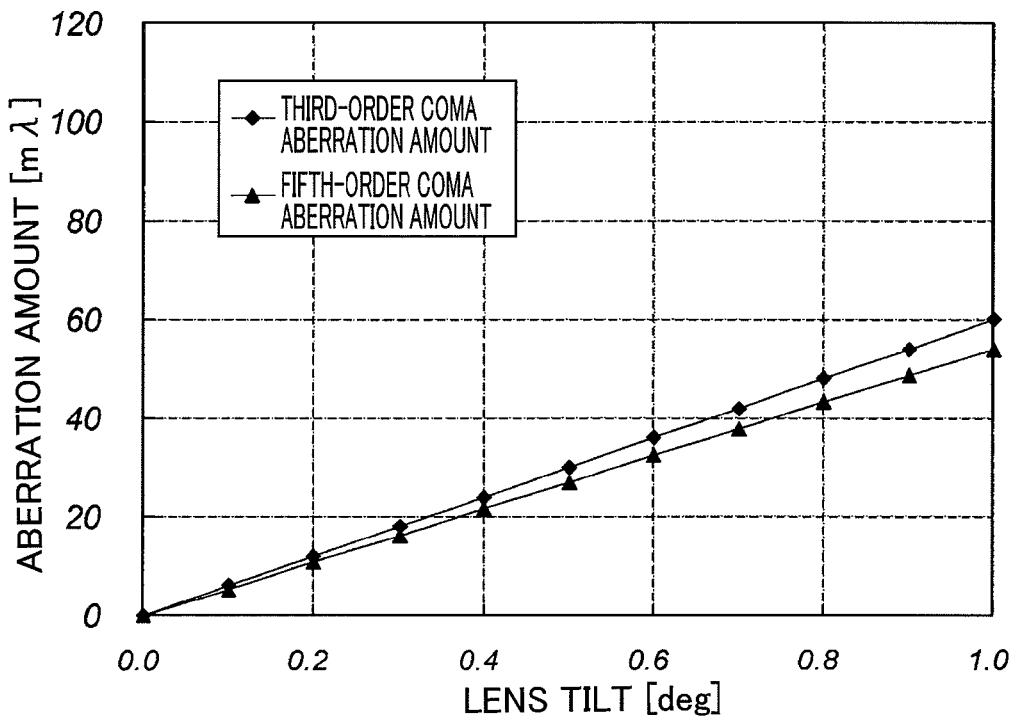
FIG. 8 is a graph showing a relationship of lens tilt and coma aberrations at the time of recording or reproducing information on or from the CD in the first embodiment of the invention.

FIG. 8 is a graph showing a relationship of the tilt of the objective lens (lens tilt) and third-order and fifth-order coma aberration amounts generated at the time of recording or reproducing information on or from the CD 80. In FIG. 8, a horizontal axis represents the tilt of the objective lens (lens tilt) and a vertical axis represents the third-order and fifth-order coma aberration amounts. Rhombic points indicate the third-order coma aberration amount, and triangular points indicate the fifth-order coma aberration amount. In the objective lens 6 of this embodiment, third-order coma aberration of 36.0 mλ is generated and fifth-order coma aberration of 32.4 mλ is generated for a lens tilt of 0.6° as shown in FIG. 8.

It can be understood from FIGS. 6 to 8 that the polarity of the third-order coma aberration generated by the disc tilt and that of the third-order coma aberration generated by the lens tilt coincide and the third-order coma aberrations at the time of off-axis incidence are not canceled out.

Here, if it is assumed that a focal length fcl of the collimator lens 4 of this embodiment is 15.0 mm and the distance δ between the emission points of the red laser light and the infrared laser light of the two-wavelength laser light source 1 is 0.1 mm, an angle of view is 0.38°. Accordingly, from FIG. 6, third-order coma aberration of 45.6 mλ is generated and fifth-order coma aberration of 22.8 mλ is generated even if a relative tilt of the CD 80 and the objective lens 6 is zero.

The third-order and fifth-order coma aberrations can be corrected by tilting the objective lens 6 relative to the CD 80.

Figure 9:
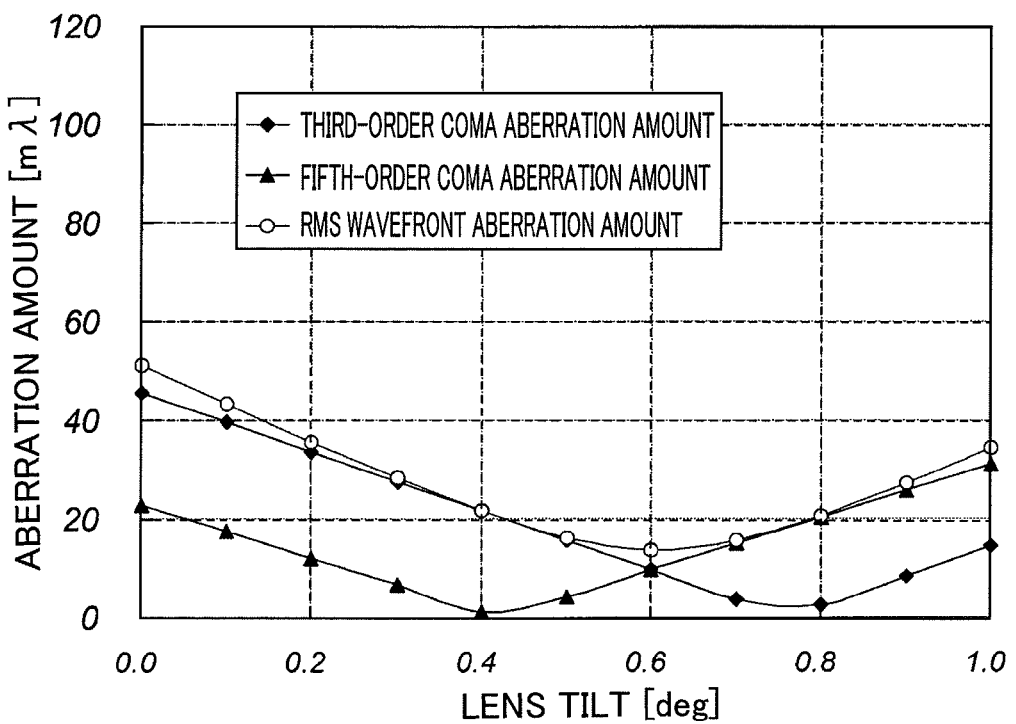
FIG. 9 is a graph showing coma aberration amounts in the case of tilting an objective lens with coma aberrations remaining at the time of recording or reproducing information on or from the CD in the first embodiment of the invention.

FIG. 9 is a graph showing coma aberration amounts in the case of tilting the objective lens 6 with third-order coma aberration of 45.6 mλ and fifth-order coma aberration 22.8 mλ remained when the relative tilt of the CD 80 and the objective lens 6 is zero. In FIG. 9, a horizontal axis represents the lens tilt amount and a vertical axis represents the third-order and fifth-order coma aberration amounts and total wavefront aberration amount (RMS (Root Mean Square) wavefront aberration amount). Rhombic points indicate the third-order coma aberration amount, triangular points indicate the fifth-order coma aberration amount and white round points indicate the RMS wavefront aberration amount.

It can be understood from FIG. 9 that the third-order coma aberration can be set to about 0 mλ and the fifth-order coma aberration can be set to 18.2 mλ, for example, by setting the lens tilt amount of the objective lens 6 to 0.76°. In other words, the objective lens actuator 9 tilts the objective lens 6 so that the third-order coma aberration becomes substantially zero. Further, by setting the lens tilt amount of the objective lens 6 to 0.42°, the third-order coma aberration can be set to about 20.4 mλ and the fifth-order coma aberration can be set to about 0 mλ.

On the other hand, by setting the lens tilt amount of the objective lens 6 to 0.60°, both the third-order coma aberration and the fifth-order coma aberration are set to about 9.6 mλ and, at this time, the total wavefront aberration is minimized (13.6 mλrms). In other words, the objective lens actuator 9 tilts the objective lens 6 such that the absolute value of the third-order coma aberration and that of the fifth-order coma aberration are substantially equal.

The third-order and fifth-order coma aberrations remaining after the lens tilt are preferably suitably allocated according to an optical disc system employing the optical head of this embodiment. For example, it is possible to enlarge a tilt margin by zeroing the third-order coma aberration or to suppress a peak intensity reduction by minimizing the total wavefront aberration. Further, by balancing these, the remaining third-order coma aberration may be set less than the remaining fifth-order coma aberration. In other words, the objective lens actuator 9 tilts the objective lens 6 such that the absolute value of the third-order coma aberration is smaller than that of the fifth-order coma aberration.

As described above, in the objective lens 6 of this embodiment, third-order coma aberration of 72.0 mλ is generated for an angle of view of 0.6° and third-order coma aberration of 36.0 mλ is generated for a lens tilt of 0.6°. Accordingly, third-order coma aberration of 45.6 mλ generated in the case where an angle of view α is 0.38° can be corrected by a lens tilt of 0.76°.

However, for example, if an objective lens with third-order coma aberration of 54.0 mλ is generated for an angle of view of 0.6° and third-order coma aberration of 18.0 mλ is generated for a lens tilt of 0.6° is used, the third-order coma aberration generated in the case where the angle of view α is 0.38° is 34.2 mλ, which is less than the third-order coma aberration generated in the objective lens 6 of this embodiment. However, for the correction of this third-order coma aberration, a lens tilt of 1.14° is necessary.

The above contents can be generalized as follows.

If CMD (mλ/°) denotes a third-order coma aberration amount generated by disc tilt per unit angle and CML (mλ/°) denotes a third-order coma aberration amount generated by lens tilt per unit angle, a third-order coma aberration amount CMA (mλ/°) generated by off-axis incidence per unit angle is expressed by the following Equation (1).

$$CMA = CMD + CML \quad (1)$$

An angle of view determined from the distance δ between the emission points of laser lights and a focal length fcl of a collimator lens, i.e. an angle α (0) between the optical axes of the laser lights and that of an objective lens is expressed by the following Equation (2). If another lens such as a relay lens is provided between the two-wavelength laser light source 1 and the collimator lens 4, the focal length fcl becomes a combined focal length of these lenses.

$$\alpha = \arctan(\delta/fcl) \quad (2)$$

A third-order coma aberration amount (mλ) generated by off-axis incidence is expressed by the following Equation (3), and a lens tilt amount θ (°) for correcting this third-order coma aberration is expressed by the following Equation (4).

$$CMA \times \alpha = (CMD + CML) \times \alpha \quad (3)$$

$$\theta = (CMD + CML) \times \alpha / CML \quad (4)$$

Since the third-order coma aberration CMD generated by disc tilt per unit angle is constant independently of objective lens design, the lens tilt amount θ at the angle of view α is uniquely determined by the third-order coma aberration amount CML generated by lens tilt per unit angle.

Figure 10:
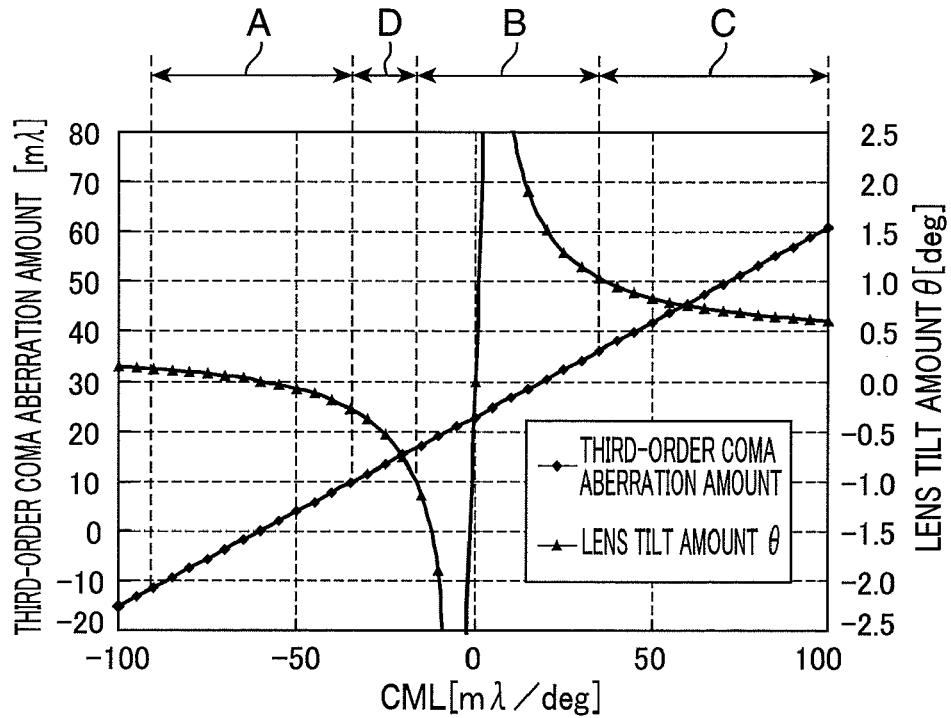
FIG. 10 is a graph showing a relationship of a third-order coma aberration amount generated by lens tilt per unit angle, a third-order coma aberration amount generated by off-axis incidence and a lens tilt amount for correcting the third-order coma aberration.

FIG. 10 is a graph showing a relationship of the third-order coma aberration CML generated by lens tilt per unit angle, the third-order coma aberration amount generated by off-axis incidence and the lens tilt amount θ for correcting this third-order coma aberration in the case where the third-order coma aberration amount CMD generated by disc tilt per unit angle is 60 mλ/° and the angle of view α is 0.38°.

In FIG. 10, a horizontal axis represents the third-order coma aberration CML (mλ/°) generated by lens tilt per unit angle, a left vertical axis represents the third-order coma aberration amount (mλ) generated by off-axis incidence and a right vertical axis represents the lens tilt amount θ (°) for correcting the third-order coma aberration generated by off-axis incidence. Further, rhombic points indicate the third-order coma aberration amount and triangular points indicate the lens tilt amount θ.

From FIG. 10, the third-order coma aberration amount generated by off-axis incidence is 10 mλ or less in the case where the third-order coma aberration amount CML generated by lens tilt per unit angle is in a range A. Accordingly, it is substantially unnecessary to correct the third-order coma aberration amount by the lens tilt in this case, which lies outside the range of application of this embodiment.

Next, the third-order coma aberration amount generated by off-axis incidence can be corrected by a lens tilt of 1.0° or smaller in the case where the third-order coma aberration amount CML generated by lens tilt per unit angle is in a range C. Accordingly, this case is suitable as an objective lens, to which this embodiment is applied.

The third-order coma aberration amount generated by off-axis incidence can be corrected by a lens tilt of 1.0° or smaller also in the case where the third-order coma aberration amount CML generated by lens tilt per unit angle is in a range D. As shown in FIG. 10, the polarity of the lens tilt amount θ in the range D is opposite to that of the lens tilt amount θ in the range C.

However, a lens tilt amount of 1.0° or larger is necessary to correct the third-order coma aberration amount generated by off-axis incidence in the case where the third-order coma aberration amount CML generated by lens tilt per unit angle is in a range B. Particularly, the correction itself is impossible in the case where the third-order coma aberration amount CML generated by lens tilt per unit angle is 0.

Figure 11:
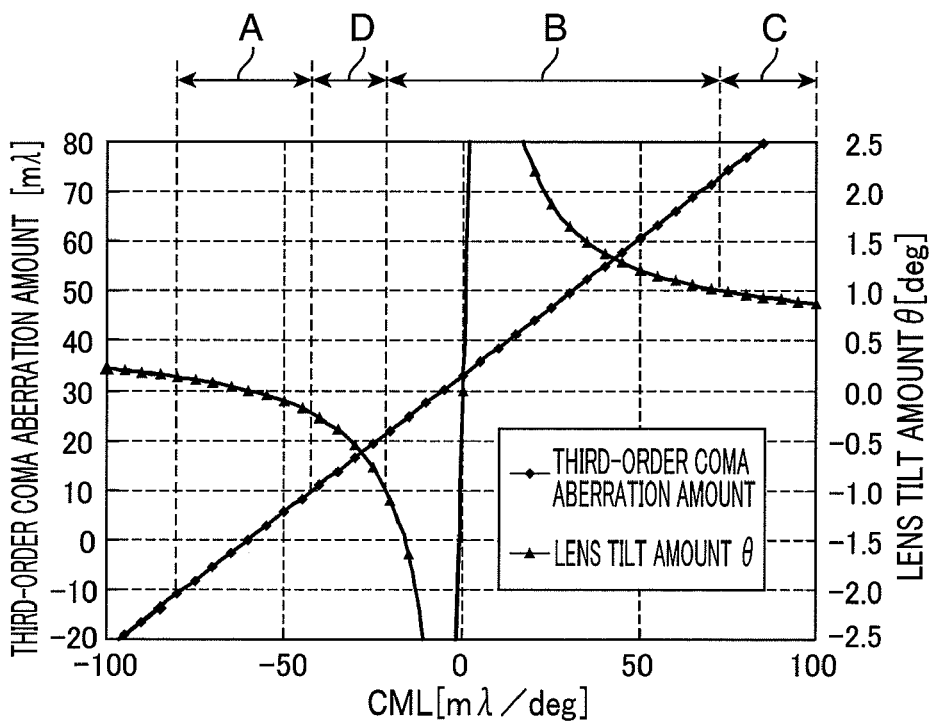
FIG. 11 is another graph showing the relationship of the third-order coma aberration amount generated by lens tilt per unit angle, the third-order coma aberration amount generated by off-axis incidence and the lens tilt amount for correcting the third-order coma aberration.

Similarly, FIG. 11 is a graph showing a relationship of the third-order coma aberration CML generated by lens tilt per unit angle, the third-order coma aberration amount generated by off-axis incidence and the lens tilt amount θ for correcting this third-order coma aberration in the case where the third-order coma aberration amount CMD generated by disc tilt per unit angle is 60 mλ/° and the angle of view α is 0.55°.

In FIG. 11, a horizontal axis represents the third-order coma aberration CML (mλ/°) generated by lens tilt per unit angle, a left vertical axis represents the third-order coma aberration amount (mλ) generated by off-axis incidence and a right vertical axis represents the lens tilt amount θ (°) for correcting the third-order coma aberration generated by off-axis incidence. Further, rhombic points indicate the third-order coma aberration amount and triangular points indicate the lens tilt amount θ.

In FIG. 11 as well, the third-order coma aberration amount generated by off-axis incidence is 10 mλ or less in the case where the third-order coma aberration amount CML generated by lens tilt per unit angle is in a range A. Accordingly, it is substantially unnecessary to correct the third-order coma aberration amount by the lens tilt in this case, which lies outside the range of application of this embodiment.

Next, the third-order coma aberration amount generated by off-axis incidence can be corrected by a lens tilt of 1.0° or smaller in the case where the third-order coma aberration amount CML generated by lens tilt per unit angle is in a range C. Accordingly, this case is suitable as an objective lens, to which this embodiment is applied. Similarly, the third-order coma aberration amount generated by off-axis incidence can be corrected by a lens tilt of 1.0° or smaller also in the case where the third-order coma aberration amount CML generated by lens tilt per unit angle is in a range D. It should be noted that the polarity of the lens tilt amount θ in the range D is opposite to that of the lens tilt amount θ in the range C.

A lens tilt amount of 1.0° or larger is necessary to correct the third-order coma aberration amount generated by off-axis incidence in the case where the third-order coma aberration amount CML generated by lens tilt per unit angle is in a range B. Particularly, the correction itself is impossible in the case where the third-order coma aberration amount CML generated by lens tilt per unit angle is 0.

If the lens tilt amount increases, there is a higher possibility that an optical disc and an objective lens come into contact if the objective lens has a short working distance (WD) and other aberrations such as astigmatism may not be ignored. Accordingly, an objective lens with a lens tilt amount of, e.g. 1.0° or smaller at the time of coma aberration correction is more desirable.

Specifically, if CMD (mλ/°) denotes a third-order coma aberration amount generated by the tilt of a CD per unit angle, CML (mλ/°) a third-order coma aberration amount generated by the tilt of an objective lens per unit angle and α (°) an angle between the optical axis of the objective lens and that of an infrared laser light emitted from a two-wavelength laser light source in the case of focusing the infrared laser light on an information recording layer of the CD, the objective lens preferably satisfies $1.0 \geq (CMD+CML) \times \alpha / CML$.

In order to correct coma aberration generated by off-axis incidence by tilting the objective lens 6, the coma aberration needs to be generated in a radial direction of the optical disc. This is because the objective lens actuator 9 supports the objective lens holder 9b (movable part) by a plurality of suspension wires 9a as shown in FIG. 2, it is possible to tilt the objective lens in the radial directions D3 of the optical disc in addition to displacing it in the focusing direction D1 and the tracking direction D2, but it is generally difficult to tilt the objective lens in an information track direction of the optical disc.

Figure 12:
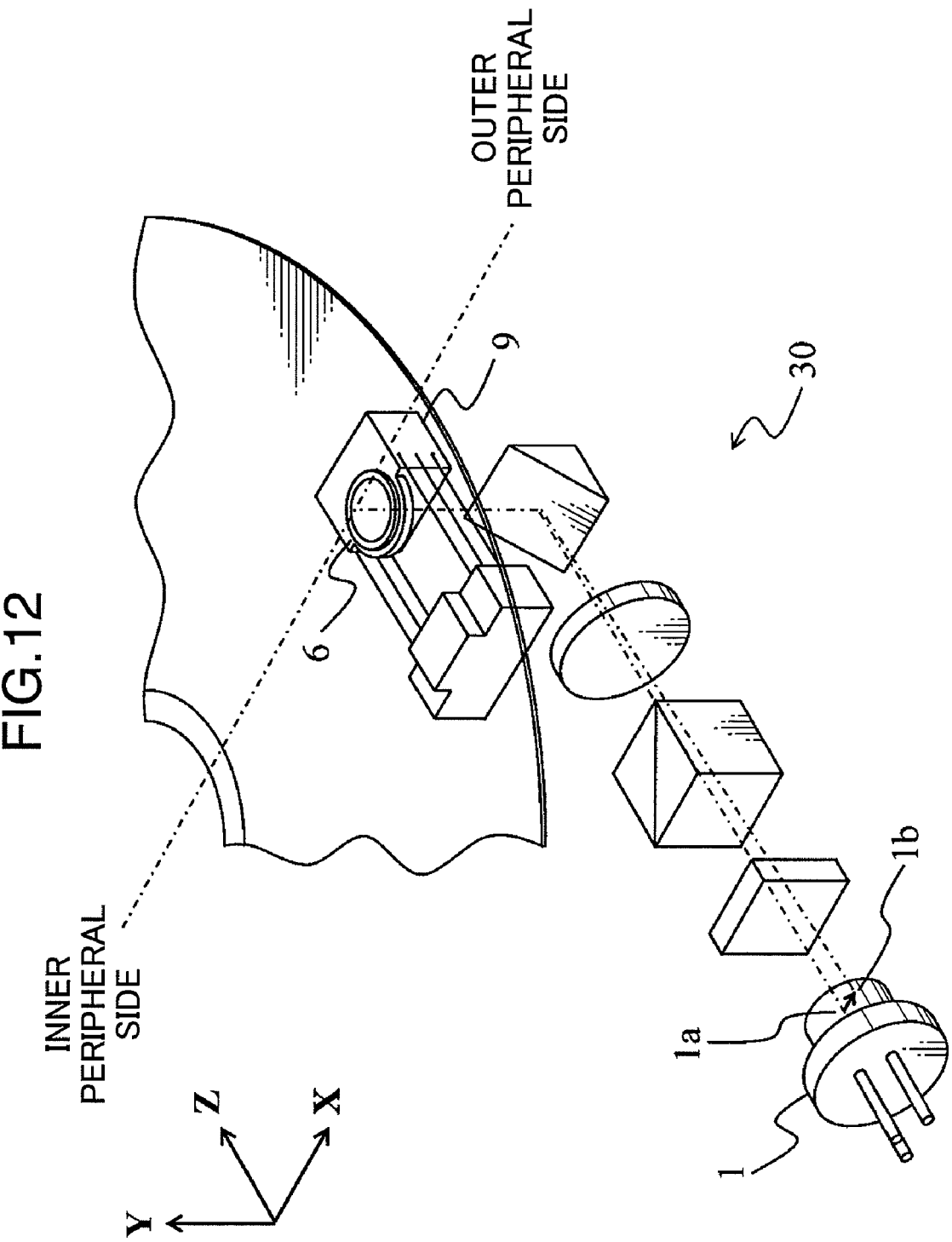
FIG. 12 is a diagram showing the arrangement of the emission points of the optical head in the first embodiment of the invention.

FIG. 12 is a diagram showing the arrangement of the emission points of the optical head according to the first embodiment of the present invention. The two-wavelength laser light source 1 of this embodiment is, as shown in FIG. 12, arranged such that the emission point 1b of the infrared laser light is offset in a radial direction (X-direction) of the optical disc relative to the emission point 1a of the red laser light. Specifically, the emission point 1a of the red laser light and the emission point 1b of the infrared laser light are arranged side by side in the radial direction (X-direction) of the optical disc. The two-wavelength laser light source 1 is arranged such that the optical axis of the red laser light and that of the objective lens 6 substantially coincide at the objective lens 6. Thus, the third-order and fifth-order coma aberrations generated by off-axis incidence on the objective lens 6 are generated in the radial direction (X-direction) of the optical disc. Therefore, the third-order and fifth-order coma aberrations generated by off-axis incidence can be corrected by tilting the objective lens 6 mounted on the objective lens actuator 9 in the radial direction.

Figure 13:
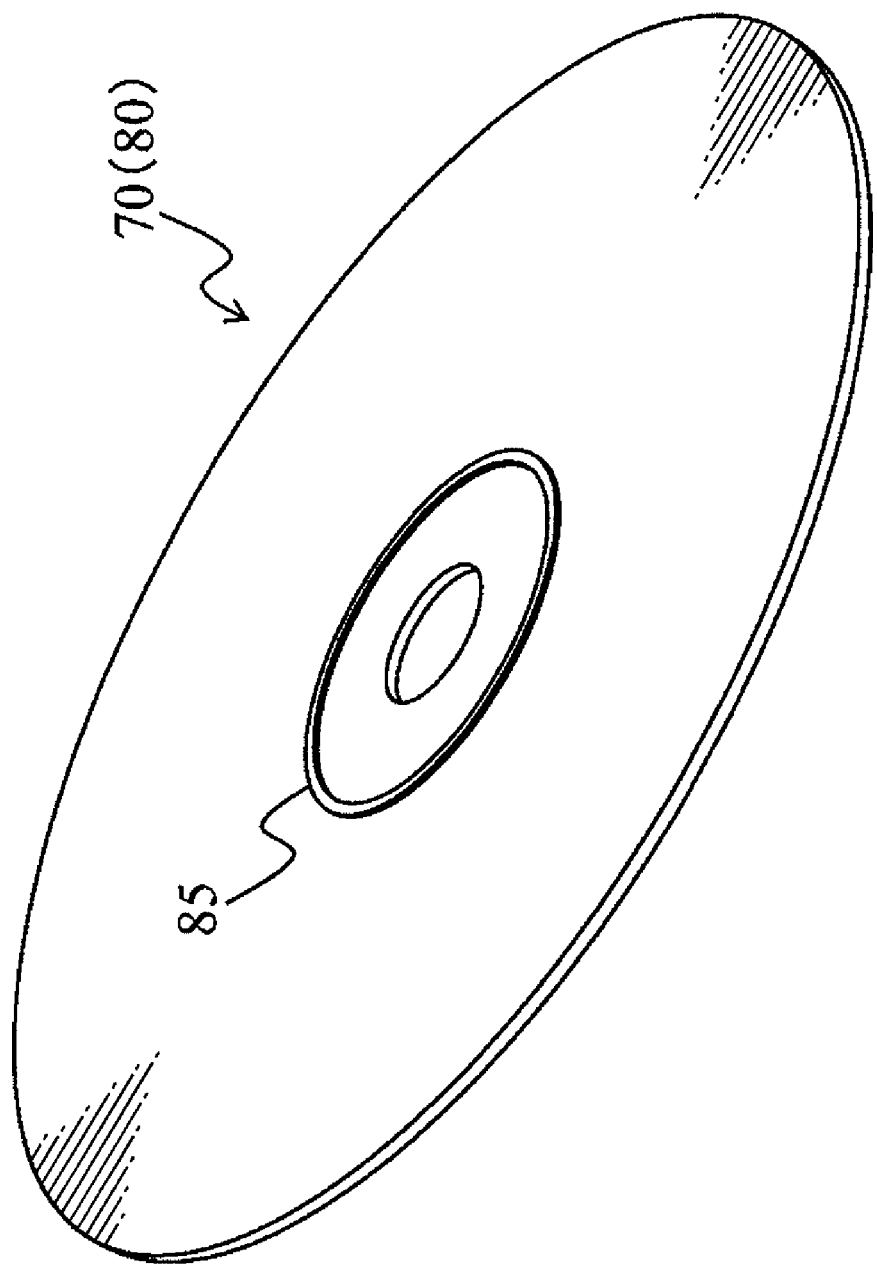
FIG. 13 is a diagram showing an example of an optical disc with a stack ring.

Optical discs such as the DVD 70 and the CD 80 are formed with a rib called a stack ring 85 as shown in FIG. 13 at an inner peripheral part (outside a clamp area) so as to prevent light incidence surfaces from coming into contact in the case of stacking optical discs. FIG. 13 is a diagram showing an example of an optical disc with a stack ring.

The stack ring 85 has a thickness of several 100 μm and, particularly in the case of using an objective lens with a short working distance (WD), the contact of the stack ring 85 and the objective lens 6 has to be prevented at the time of recording or reproducing information on or from the inner peripheral part of the optical disc.

In the optical head 30 of this embodiment, the two-wavelength laser light source 1 is arranged such that the infrared laser light from the emission point 1b is incident on an outer peripheral side of the optical disc relative to the optical axis of the objective lens 6 as shown in FIG. 12. In other words, the two-wavelength laser light source 1 is arranged to correct coma aberration generated in the radial direction of the CD 80 if the objective lens 6 is tilted to locate an inner peripheral end thereof in the radial direction of the CD 80 lower than an outer peripheral end thereof.

Figure 14:
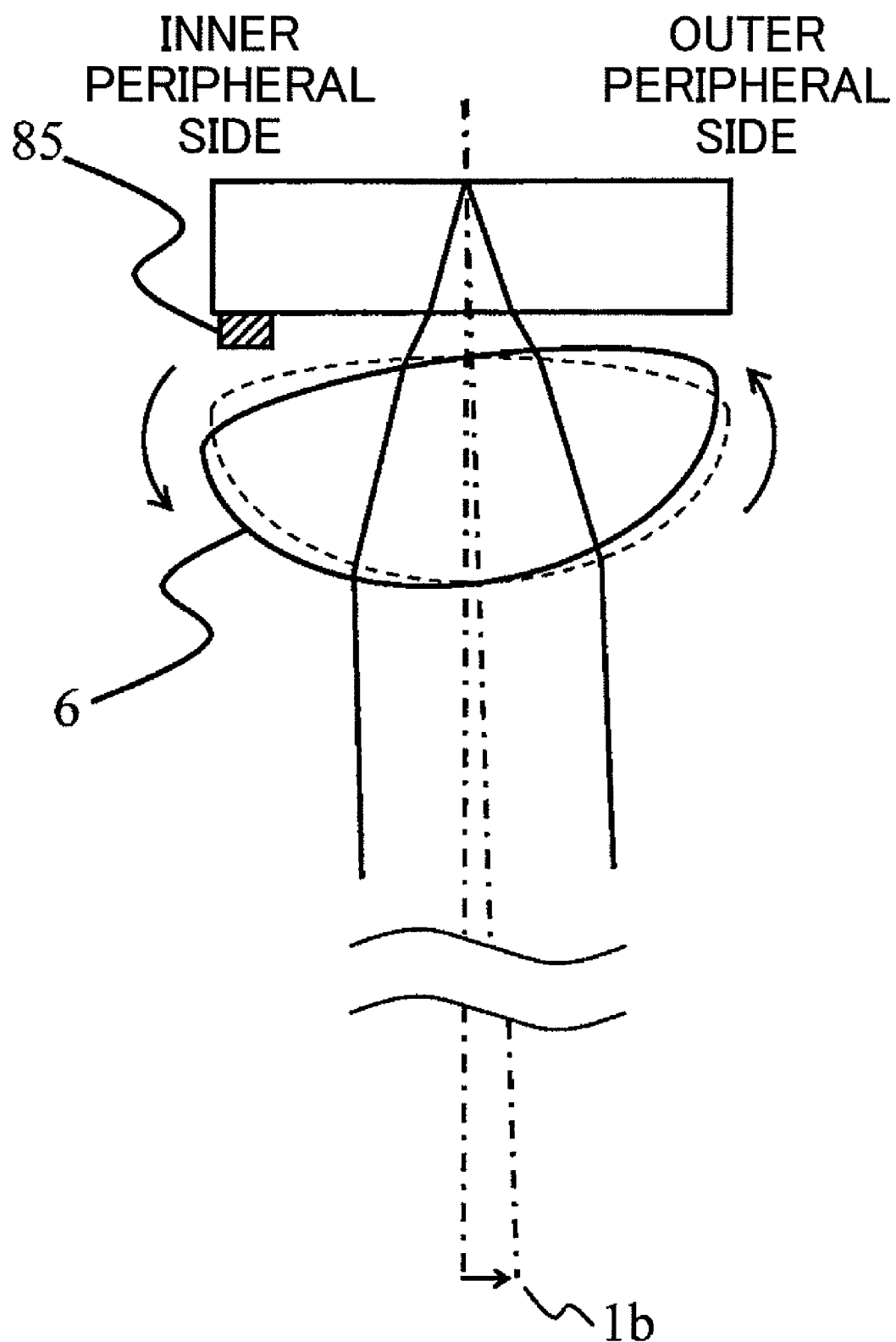
FIG. 14 is a diagram showing an objective lens tilting direction in the first embodiment of the invention.

FIG. 14 is a diagram showing a tilting direction of the objective lens in the first embodiment of the present invention. The polarity of coma aberration generated by off-axis incidence on a specified objective lens is uniquely determined by the position of the emission point of the laser light. Thus, the tilting direction of the objective lens 6 to correct the coma aberration is also uniquely determined by the position of the emission point of the laser light.

The objective lens actuator 9 tilts the objective lens 6 to locate the inner peripheral end of the objective lens 6 in the radial direction of the CD 80 lower than the outer peripheral end thereof.

In this embodiment, for example, the third-order coma aberration amount CML is 60 m$\lambda$/° and the emission point 1b of the infrared laser light is offset toward the outer peripheral side in the radial direction (X-direction) of the optical disc. In this case, the objective lens 6 is constantly tilted in a direction away from the stack ring 85, i.e. in a direction to locate the outer peripheral side higher than the inner peripheral side as shown in FIG. 14. Thus, it is possible to correct the third-order and fifth-order coma aberrations generated by off-axis incidence and to suppress the contact of the stack ring 85 and the objective lens 6.

On the other hand, for example, the third-order coma aberration amount CML is −30 m$\lambda$/° and the emission point 1b of the infrared laser light is offset toward the inner peripheral side in the radial direction (X-direction) of the optical disc in this embodiment. In this case, the polarity of the third-order coma aberration generated by the off-axis incidence is opposite to the one in the case where the third-order coma aberration amount CML is 60 m$\lambda$/°. However, the polarity of the third-order coma aberration generated by lens tilt is opposite, with the result that the objective lens 6 is tilted in the direction away from the stack ring 85, i.e. in the direction to locate the outer peripheral side in the radial direction higher than the inner peripheral side. Thus, it is possible to correct the third-order and fifth-order coma aberrations generated by off-axis incidence and to suppress the contact of the stack ring 85 and the objective lens 6.

It has been, thus far, described to arrange the emission point 1b of the infrared laser light at the outer or inner peripheral side in the radial direction (X-direction) of the optical disc in the construction of the optical head 30 of FIG. 12. However, the gist of this embodiment is to arrange the emission points such that coma aberration can be corrected by tilting the objective lens 6 in a direction to locate the outer peripheral side of the optical disc higher than the inner peripheral side thereof. Therefore, the arrangement direction of the emission point of the infrared laser light is not limited to either the outer peripheral side or the inner peripheral side in the radial direction of the optical disc.

For example, if the third-order coma aberration amount CML is 60 m$\lambda$/°, a laser light needs to be incident from an outer peripheral side relative to the optical axis of the objective lens 6 as shown in FIG. 14 in order to be able to correct the coma aberration by tilting the objective lens 6 in a direction to lower the inner peripheral side of the optical disc where the stack ring 85 is present, i.e. in a direction to elevate the outer peripheral side. In other words, the emission point of the infrared laser light needs to be arranged at the outer peripheral side in the radial direction of the optical disc if the optical axis of the infrared laser light emitted from the two-wavelength laser light source 1 is substantially parallel to an information track of the optical disc as in the construction of the optical head of FIG. 12.

Accordingly, if a laser light emitted from a light source is, for example, incident on an objective lens via a plurality of reflection surfaces in an optical path in the construction of an optical head with an optical arrangement different from the optical head 30 of this embodiment, the gist of this embodiment is to properly arrange an emission point of the laser light such that the laser light is incident from an outer peripheral side relative to the optical axis of the objective lens. This does not necessarily mean to arrange the emission point of the laser light at the outer peripheral side in the radial direction of the optical disc.

The above can be summarized as follows.

Specifically, a condition on which the objective lens 6 of this embodiment lies in the range C in FIGS. 10 and 11 is expressed by Equation (5).

$$1.0 \geq (CMD + CML) \times \arc \tan(\delta/fcl)/CML > 0 \quad (5)$$

It is assumed that CMD (m$\lambda$/°) denotes a third-order coma aberration amount generated by the tilt of an information recording medium per unit angle, CML ((m$\lambda$/°) a third-order coma aberration amount generated by the tilt of an objective lens per unit angle, δ (mm) a distance between emission points of laser lights and fcl (mm) the focal length of a collimator lens. If another lens such as a relay lens is provided between the two-wavelength laser light source 1 and the collimator lens 4, the focal length fcl is a combined focal length of these lenses.

At this time, the two-wavelength laser light source 1 is preferably arranged such that a laser light is incident from an outer peripheral side relative to the optical axis of the objective lens 6. In other words, the two-wavelength laser light source 1 is arranged such that a laser light is incident from the outer peripheral side relative to the optical axis of the objective lens 6 when the above Equation (5) is satisfied.

On the other hand, a condition on which the objective lens 6 of this embodiment lies in the range D in FIGS. 10 and 11 is expressed by Equations (6) and (7).

$$(CMD+CML) \times \arctan(\delta/fcl)/CML \geq -1.0 \quad (6)$$

$$(CMD+CML) \times \arctan(\delta/fcl) \geq 10 \quad (7)$$

At this time, the two-wavelength laser light source 1 is preferably arranged such that a laser light is incident from an inner peripheral side relative to the optical axis of the objective lens 6. In other words, the two-wavelength laser light source 1 is arranged such that a laser light is incident from the inner peripheral side relative to the optical axis of the objective lens 6 when the above Equations (6) and (7) are satisfied.

Thus, if the infrared laser light is incident from the outer peripheral side of the CD 80 relative to the optical axis of the objective lens 6, the objective lens 6 can be tilted to lower the inner peripheral end of the objective lens 6 in the radial direction of the CD 80 than the outer peripheral end thereof by satisfying the above Equation (5). Further, if the infrared laser light is incident from the inner peripheral side of the CD 80 relative to the optical axis of the objective lens 6, the objective lens 6 can be tilted to lower the inner peripheral end of the objective lens 6 in the radial direction of the CD 80 than the outer peripheral end thereof by satisfying the above Equations (6) and (7).

FIG. 15 are diagrams showing a polarization direction of a laser light incident on the beam splitter in the first embodiment of the present invention, wherein FIG. 15A shows the polarization direction of the laser light in the case where the laser light incident on the beam splitter is transmitted and FIG. 15B shows the polarization direction of the laser light in the case where the laser light incident on the beam splitter is reflected.

In the case of arranging the two-wavelength laser light source 1 as shown in FIG. 12 and using the beam splitter 3 to transmit the laser light, the laser light incident on the beam splitter 3 becomes a P-polarized light as shown in FIG. 15A and the transmission efficiency of the beam splitter 3 can be increased.

On the other hand, in the case of using the beam splitter 3 to reflect the laser light as shown in FIG. 15B, it is preferable to increase the reflection efficiency of the beam splitter 3 by arranging a half wave plate 8 between the two-wavelength laser light source 1 and the beam splitter 3 to make the laser light incident on the beam splitter 3 to an S-polarized light. The half wave plate 8 converts the laser light emitted from the two-wavelength laser light source 1 from the P-polarized light into the S-polarized light.

Figure 16:
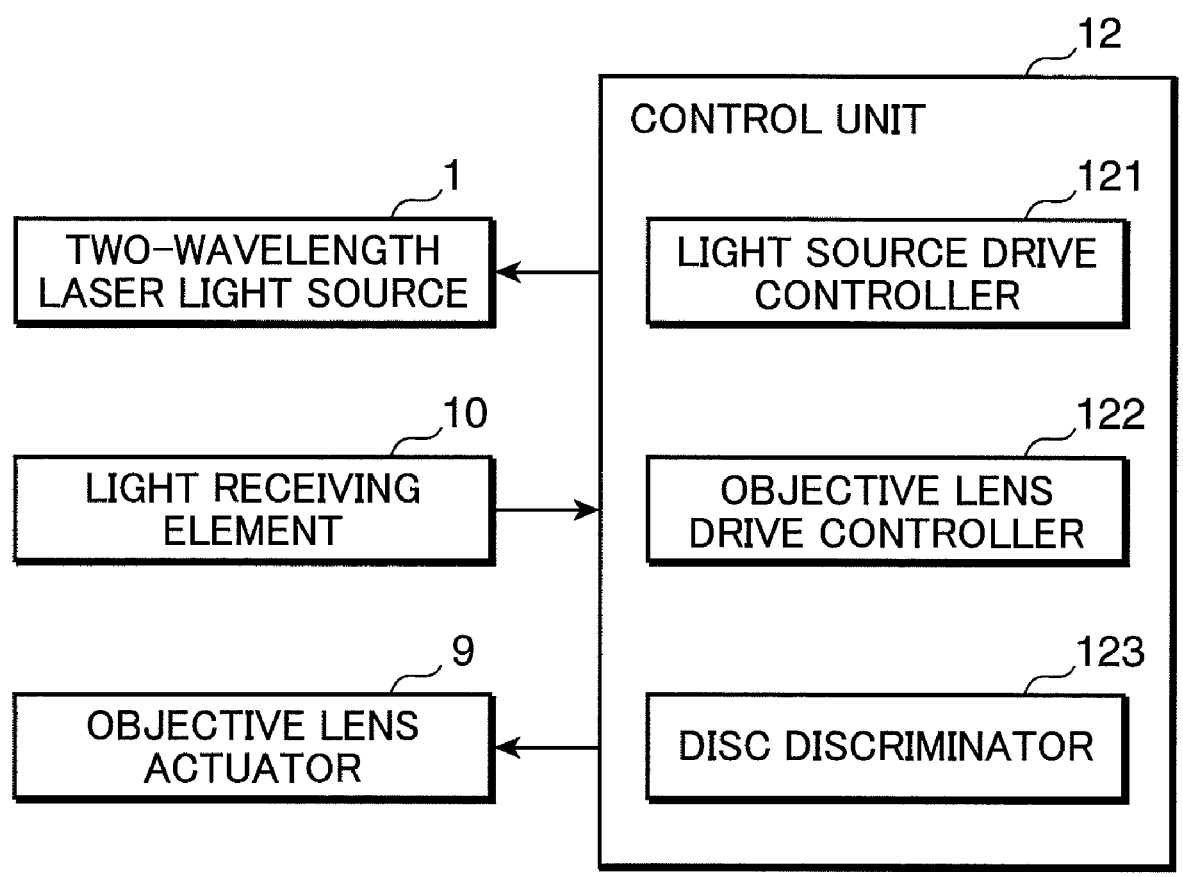
FIG. 16 is a schematic diagram showing the electrical construction of the optical head according to the first embodiment of the invention.

FIG. 16 is an electrical schematic construction diagram of the optical head according to the first embodiment of the present invention. In FIG. 16, the two-wavelength laser light source 1, the light receiving element 10 and the objective lens actuator 9 are connected with a control unit 12. The control unit 12 is constructed, for example, by a CPU (Central Processing Unit), a ROM (Read-Only Memory), a RAM (Random Access Memory) and the like and includes a light source drive controller 121, an objective lens drive controller 122 and a disc discriminator 123.

The light source drive controller 121 controls the drive of the two-wavelength laser light source 1. The objective lens drive controller 122 controls the drive of the objective lens actuator 9. The objective lens drive controller 122 outputs an instruction to move the objective lens 6 in the focusing direction, an instruction to move the objective lens 6 in the tracking direction or an instruction to tilt the objective lens 6 in the radial direction to the objective lens actuator 9.

The disc discriminator 123 discriminates the type of an unknown optical disc. Specifically, the disc discriminator 123 discriminates whether or not the unknown optical disc to have information recorded thereon or reproduced therefrom is a DVD in a state where the tilt of the objective lens 6 is substantially zero. Further, the disc discriminator 123 discriminates whether or not the unknown optical disc to have information recorded thereon or reproduced therefrom is a CD after changing the tilt of the objective lens 6 in a direction to maximally decrease the coma aberration generated by the incidence of the infrared laser light oblique to the optical axis of the objective lens 6.

The following method can be used as an optical disc discrimination method.

For example, a red laser light is emitted to an unknown optical disc loaded into an optical disc device while driving the objective lens actuator 9 in the focusing direction D1 shown in FIG. 2, and the reflected light is detected by the light receiving element 10. The DVD 70 and the CD 80 differ in distance between the surface and the information recording layer of the optical disc, i.e. protective substrate thickness. Thus, the protective substrate thickness can be known from a difference between the position of the objective lens actuator 9 where the reflected light from the surface of the optical disc is detected by the light receiving element 10 (i.e. where the position of the focal point of the red laser light substantially coincides with the surface of the optical disc) and the position of the objective lens actuator 9 where the reflected light from the information recording layer is detected by the light receiving element 10 (i.e. where the position of the focal point of the red laser light substantially coincides with the information recording layer of the optical disc), and the optical disc can be discriminated based on the protective substrate thickness.

The optical disc discrimination method is not limited to the above method and it is apparent that any optical disc discrimination method may be used.

Figure 17:
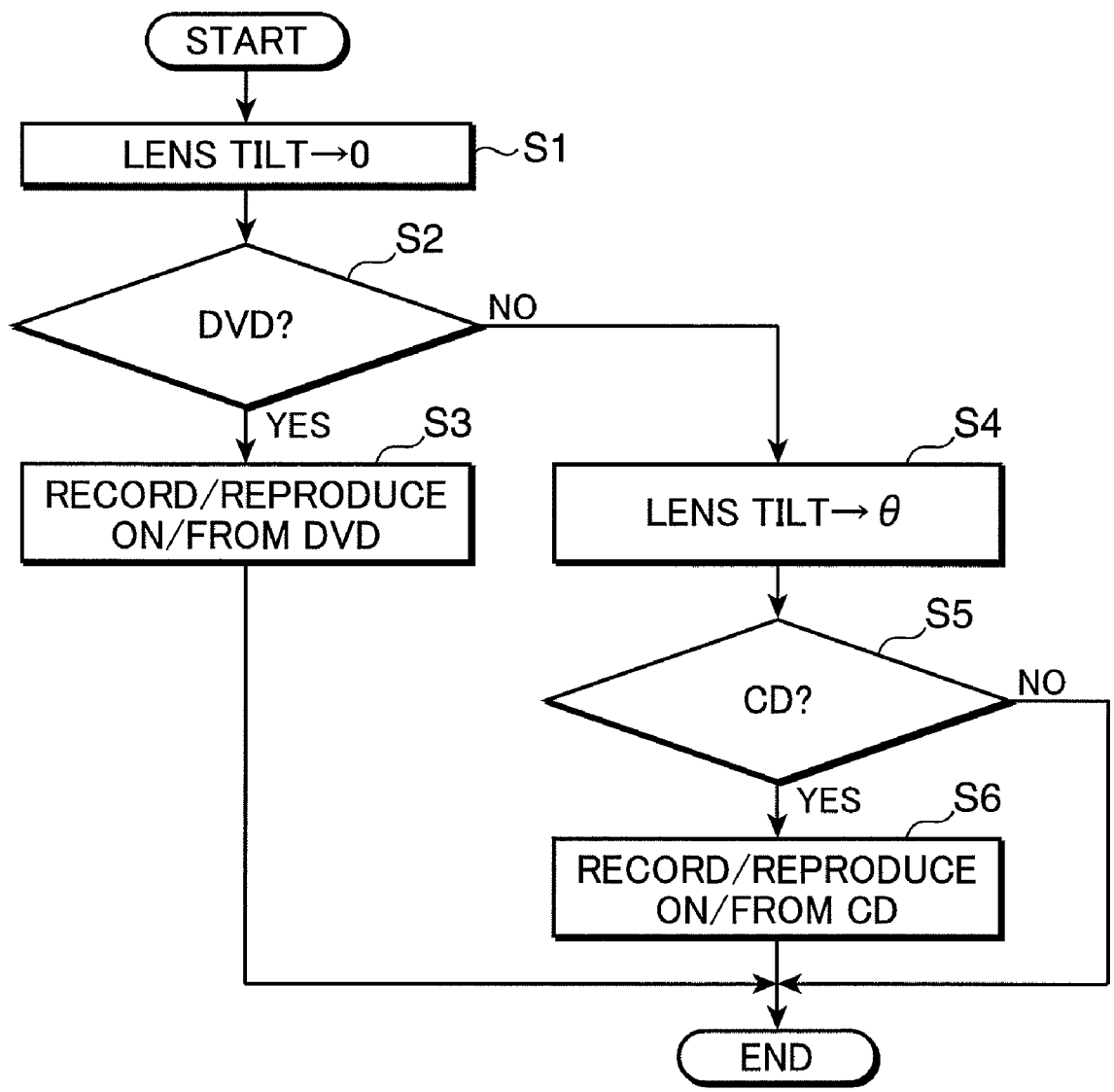
FIG. 17 is a diagram showing an example of an optical disc discrimination procedure in the first embodiment of the invention.

A timing at which the objective lens 6 is tilted to correct the third-order and fifth-order coma aberrations is related to the optical disc discrimination. An optical disc discrimination procedure may be any of those shown in FIGS. 17, 18 and 19. FIG. 17 is a flow chart showing an example of an optical disc discrimination procedure in the first embodiment of the invention.

For example, in the optical head 30 of this embodiment, the coma aberration is in an optimal state with respect to the DVD 70 without the objective lens 6 being tilted. Thus, as shown in FIG. 17, the objective lens actuator 9 first sets the tilt of the objective lens 6 to zero (Step S1). Subsequently, the disc discriminator 123 discriminates the type of the optical disc to have information recorded thereon or reproduced therefrom with the tilt of the objective lens 6 set to zero (Step S2). In other words, the disc discriminator 123 judges whether or not the optical disc is the DVD 70.

Here, if the optical disc is judged to be the DVD 70 (YES in Step S2), the control unit 12 starts recording or reproducing information on or from the DVD 70 with the tilt of the objective lens 6 maintained (Step S3). On the other hand, if the optical disc is judged not to be the DVD 70 (NO in Step S2), the objective lens actuator 9 sets the tilt of the objective lens 6 to a specified angle θ so as to optimize the coma aberration with respect to the CD 80 (Step S4). It should be noted that the specified angle θ is stored in the control unit 12 beforehand. Subsequently, in this state, the disc discriminator 123 discriminates the type of the optical disc to have information recorded thereon or reproduced therefrom (Step S5). In other words, the disc discriminator 123 judges whether or not the optical disc is the CD 80.

Here, if the optical disc is judged to be the CD 80 (YES in Step S5), the control unit 12 starts recording or reproducing information on or from the CD 80 with the tilt of the objective lens 6 maintained (Step S6). On the other hand, if the optical disc is judged not to be the CD 80 (NO in Step S5), the inserted optical disc is of a specification other than the DVD 70 and the CD 80 and information cannot be recorded on or reproduced from this optical disc, wherefore the control unit 12 ends the process.

As described above, in the optical disc discrimination procedure of the first embodiment, the tilt of the objective lens 6 is zeroed, whether or not the optical disc is a DVD is discriminated, the tilt of the objective lens 6 is changed to the angle θ if the optical disc is not a DVD, and whether or not the optical disc is a CD is discriminated.

Figure 18:
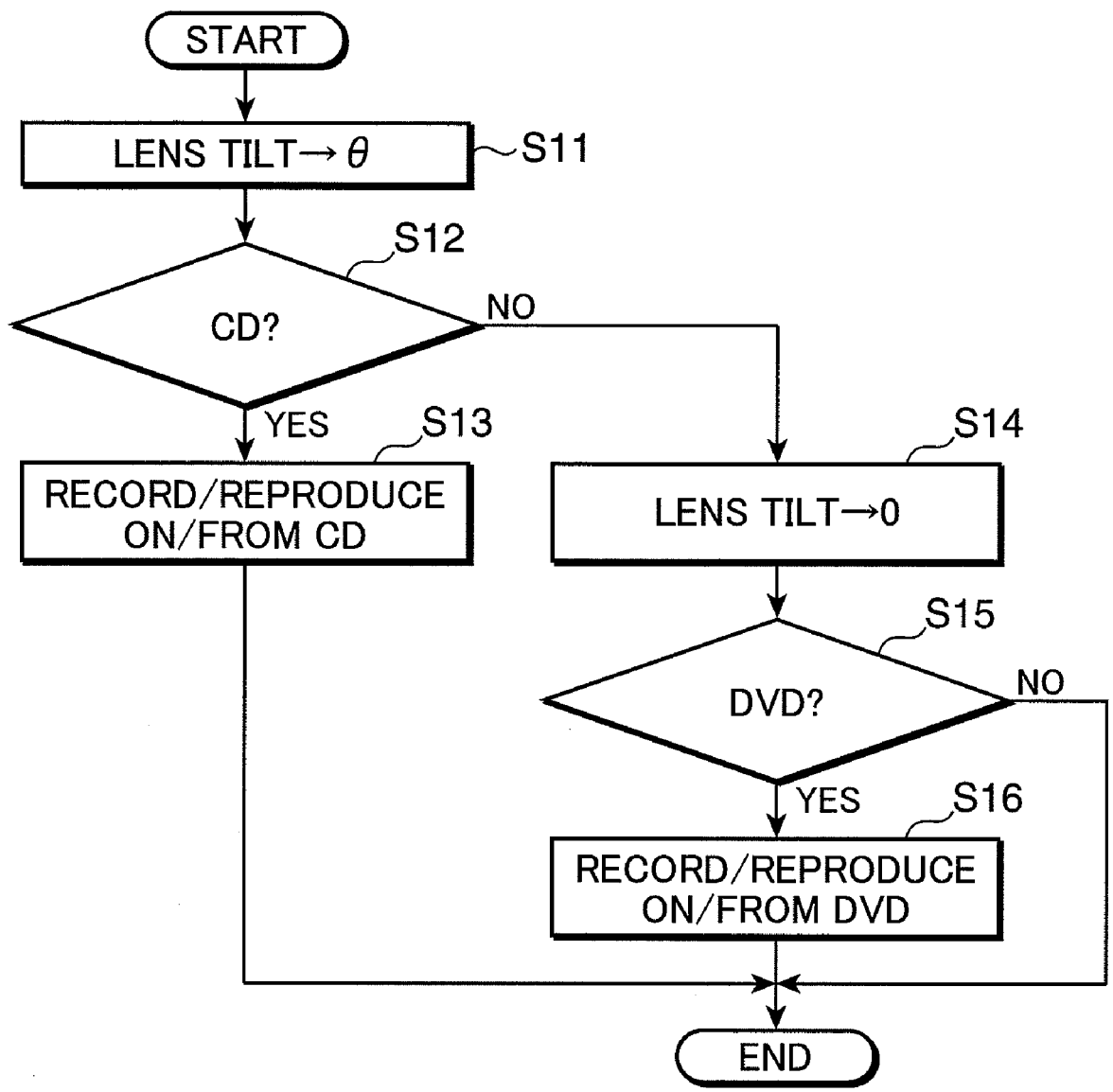
FIG. 18 is a diagram showing a first modification of the optical disc discrimination procedure in the first embodiment of the invention.

FIG. 18 is a flow chart showing a first modification of the optical disc discrimination procedure in the first embodiment of the present invention. For example, in the optical head of this modification, the coma aberration is in an optimal state with respect to the CD 80 with the objective lens 6 tilted by a specified angle θ. Thus, as shown in FIG. 18, the objective lens actuator 9 first sets the tilt of the objective lens 6 to the specified angle θ (Step S11). It should be noted that the specified angle θ is stored in the control unit 12 beforehand. Subsequently, in this state, the disc discriminator 123 discriminates the type of the optical disc to have information recorded thereon or reproduced therefrom (Step S12). In other words, the disc discriminator 123 judges whether or not the optical disc is the CD 80.

Here, if the optical disc is judged to be the CD 80 (YES in Step S12), the control unit 12 starts recording or reproducing information on or from the CD 80 with the tilt of the objective lens 6 maintained (Step S13). On the other hand, if the optical disc is judged not to be the CD 80 (NO in Step S12), the objective lens actuator 9 sets the tilt of the objective lens 6 to zero (Step S14). Subsequently, in this state, the disc discriminator 123 discriminates the type of the optical disc to have information recorded thereon or reproduced therefrom (Step S15). In other words, the disc discriminator 123 judges whether or not the optical disc is the DVD 70.

Here, if the optical disc is judged to be the DVD 70 (YES in Step S15), the control unit 12 starts recording or reproducing information on or from the DVD 70 with the tilt of the objective lens 6 maintained (Step S16). On the other hand, if the optical disc is judged not to be the DVD 70 (NO in Step S15), the inserted optical disc is of a specification other than the DVD 70 and the CD 80 and information cannot be recorded on or reproduced from this optical disc, wherefore the control unit 12 ends the process.

As described above, in the optical disc discrimination procedure according to the first modification of the first embodiment, the tilt of the objective lens 6 is changed to the angle θ, whether or not the optical disc is a CD is discriminated, the tilt of the objective lens 6 is changed to zero if the optical disc is not a CD, and whether or not the optical disc is a DVD is discriminated.

The disc discriminator 123 may discriminate the type of an unknown optical disc to have information recorded thereon or reproduced therefrom after changing the tilt of the objective lens 6 in a direction to decrease the coma aberration generated by the incidence of the infrared laser light oblique to the optical axis of the objective lens 6.

Figure 19:
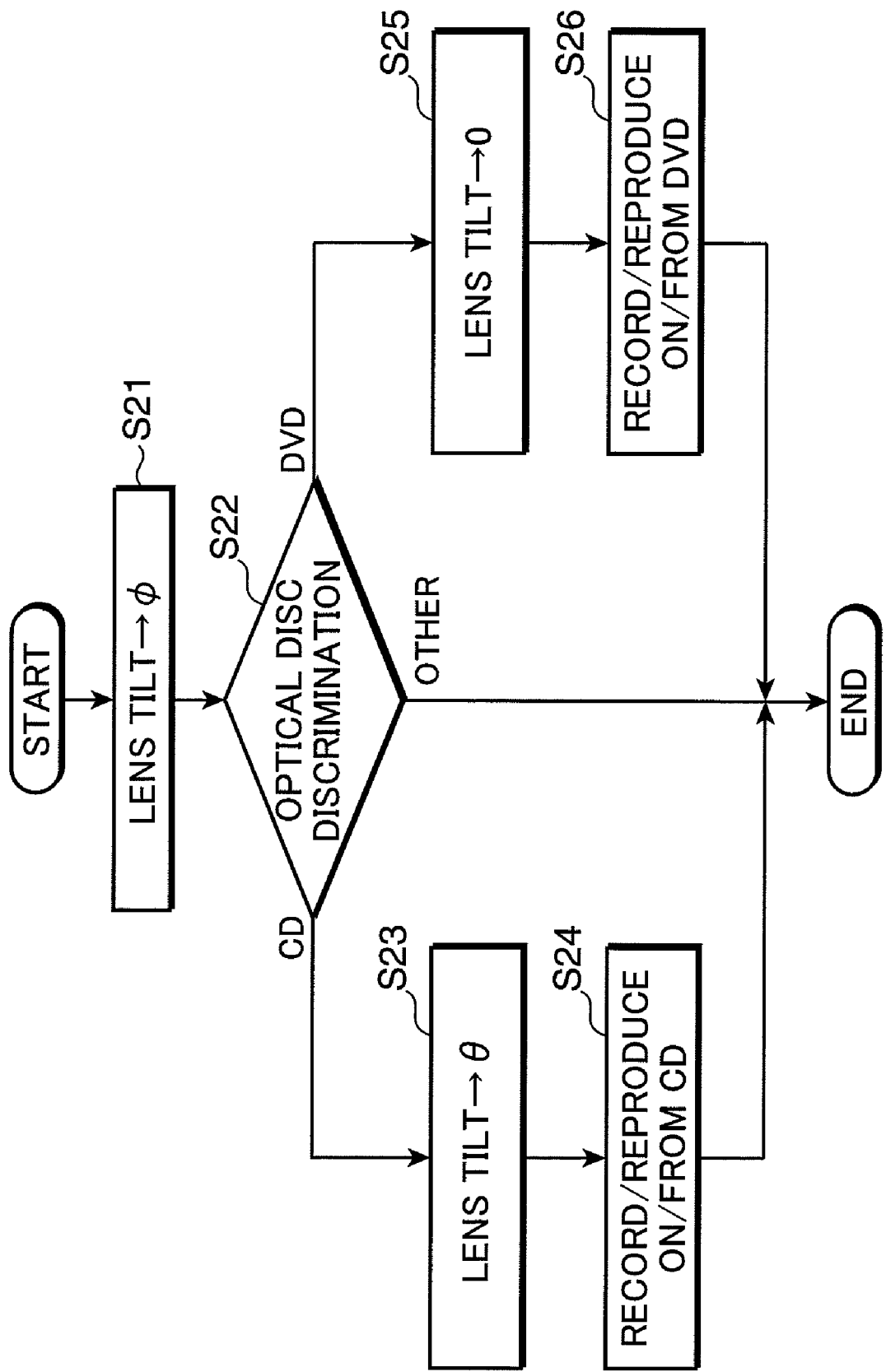
FIG. 19 is a diagram showing a second modification of the optical disc discrimination procedure in the first embodiment of the invention.

FIG. 19 is a flow chart showing a second modification of the optical disc discrimination procedure in the first embodiment of the present invention. For example, as shown in FIG. 19, the objective lens actuator 9 first sets the tilt of the objective lens 6 to a specified angle φ between the specified angle θ where the coma aberration is optimal with respect to the CD 80 and an angle 0 where the coma aberration is optimal with respect to the DVD 70 (Step S21). In this embodiment, the control unit 12 stores the specified angle θ beforehand and calculates the angle φ between the specified angle θ stored beforehand and the angle 0, but the present invention is not particularly limited to this. The control unit 12 may store the specified angle φ beforehand. Subsequently, in this state, the disc discriminator 123 discriminates the type of the optical disc to have information recorded thereon or reproduced therefrom (Step S22).

Here, if the optical disc is judged to be the CD 80 ("CD" in Step S22), the objective lens actuator 9 sets the tilt of the objective lens 6 to the specified angle θ to optimize the coma aberration with respect to the CD 80 (Step S23). Subsequently, the control unit 12 starts recording or reproducing information on or from the CD 80 with the tilt of the objective lens 6 maintained (Step S24).

On the other hand, if the optical disc is judged to be the DVD 70 ("DVD" in Step S22), the objective lens actuator 9 sets the tilt of the objective lens 6 to zero to optimize the coma aberration with respect to the DVD 70 (Step S25). Subsequently, the control unit 12 starts recording or reproducing information on or from the DVD 70 with the tilt of the objective lens 6 maintained (Step S26).

On the other hand, if the optical disc is judged to be neither the DVD 70 nor the CD 80 ("OTHER" in Step S22), the inserted optical disc is of a specification other than the DVD 70 and the CD 80 and information cannot be recorded on or reproduced from this optical disc, wherefore the control unit 12 ends the process.

As described above, in the optical disc discrimination procedure according to the second modification of the first embodiment, the type of the optical disc is discriminated by changing the tilt of the objective lens 6 to the angle φ between the angle 0 and the angle θ. The tilt of the objective lens 6 is changed to the angle θ if the optical disc is judged to be a CD, and the tilt of the objective lens 6 is changed to the angle θ if the optical disc is judged to be a DVD.

As described above, in this embodiment, the two-wavelength laser light source 1 is arranged such that the optical axis of the objective lens 6 and that of the red laser light emitted from the two-wavelength laser light source 1 are matched and the infrared laser light is incident off-axis on the objective lens 6 in the optical head 30. This is because the CD 80 to have information recorded thereon or reproduced therefrom using the infrared laser light has a large margin for the coma aberration remaining after the coma aberration correction by the lens tilt of this embodiment as against the DVD 70 to have information recorded thereon or reproduced therefrom using the red laser light.

However, the present invention is not limited to such a construction and the two-wavelength laser light source 1 may be arranged such that the optical axis of the objective lens 6 coincides with that of the infrared laser light. Such a construction has a merit of being able to correct the coma aberration by slightly tilting the objective lens 6, for example, in the case where the coma aberration generated by lens tilt is large at the time of recording or reproducing information on or from the DVD 70.

Further, the two-wavelength laser light source 1 may be arranged such that the optical axis of the objective lens 6 is located in the middle between the emission point of the red laser light and that of the infrared laser light. At this time, the two-wavelength laser light source 1 is arranged such that the coma aberrations caused by the incidence of the infrared and red laser lights oblique to the optical axis of the objective lens 6 are generated in the radial directions of the CD 80 and the DVD 70. A direction of the coma aberration generated in the radial direction of the DVD 70 is opposite to that of the coma aberration generated in the radial direction of the CD 80. The objective lens actuator 9 tilts the objective lens 6 in a direction to decrease the coma aberration generated by the incidence of the red laser light oblique to the optical axis of the objective lens 6 when the objective lens 6 focuses the red laser light on the information recording layer of the DVD 70.

In this case, there is a merit of being able to decrease the absolute value of the lens tilt amount although the lens needs to be tilted in opposite directions at the time of recording or reproducing information on or from the CD 80 and the DVD 70.

Here, an optical head manufacturing method is described. First of all, in a first step, the two-wavelength laser light source 1 for emitting an infrared laser light having a first wavelength and a red laser light having a second wavelength different from the first wavelength is so mounted as to correct coma aberration generated in the radial direction of the CD 80 if the objective lens 6 is tilted to locate the inner peripheral end of the objective lens 6 in the radial direction of the CD 80 lower than the outer peripheral end thereof. Next, in a second step, the objective lens actuator 9 is so mounted as to decrease the coma aberration generated by the incidence of the infrared laser light oblique to the optical axis of the objective lens 6 by tilting the objective lens 6 to locate the inner peripheral end of the objective lens 6 in the radial direction of the CD 80 lower than the outer peripheral end thereof in the case of recording or reproducing information on or from the CD 80 when the objective lens 6 focuses the infrared laser light on the information recording layer of the CD 80.

Although the optical head is provided with the two-wavelength laser light source and one objective lens for focusing laser lights having different wavelengths on the DVD 70 and the CD 80 in the first embodiment, the present invention is not limited to the optical head having such a construction.

For example, the present invention is also applicable to an optical head provided with a blue-violet laser light source provided separately from the two-wavelength laser light source for emitting a blue-violet laser light and another objective lens for focusing this blue-violet laser light on an information recording layer of a BD having a protective substrate thickness of about 0.1 mm.

Since the optical head provided with the laser light source and objective lens for BD and the laser light source and objective lens for the DVD 70 and the CD 80 can be arranged such that the optical axis of the blue-violet laser light and that of the objective lens can be matched independently of the optical axis of the red laser light and that of the objective lens, it apparently lies in the range of application of the present invention.

Second Embodiment

Next, a second embodiment of the present invention is described with FIGS. 20 to 24. In the second embodiment, constituent elements common to those of the first embodiment are not described below by being identified by the same reference numerals.

Figure 20:
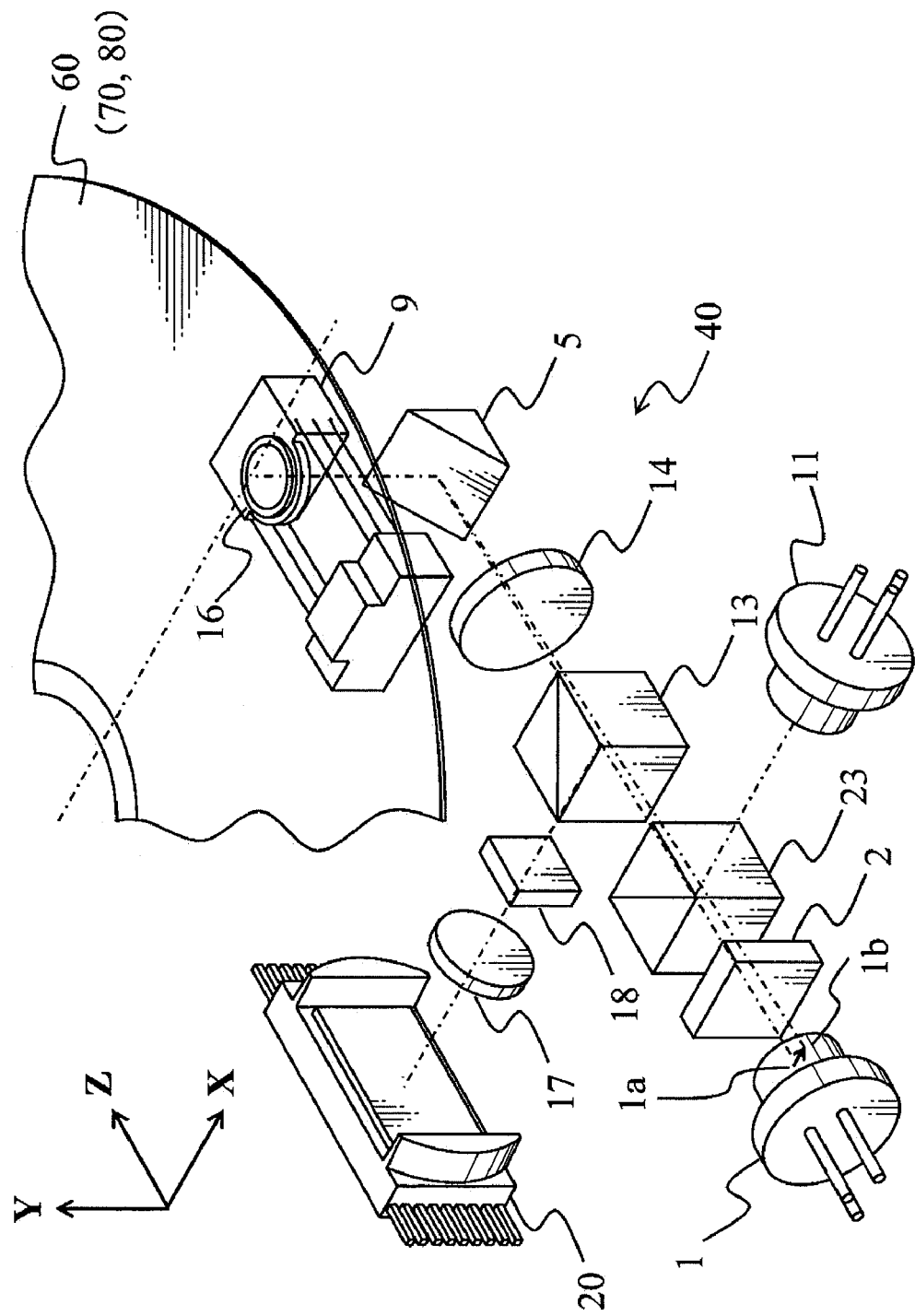
FIG. 20 is a schematic construction diagram of an optical head according to a second embodiment of the invention.

FIG. 20 is a schematic construction diagram of an optical head according to a second embodiment of the present invention. In FIG. 20, an optical head 40 is provided with a two-wavelength laser light source 1, a diffraction grating 2, a blue-violet laser light source 11, a dichroic prism 23, a beam splitter 13, a collimator lens 14, a mirror 5, an objective lens 16, an anomorphic lens 17, a holographic element 18, an objective lens actuator 9 and a light receiving element 20. The two-wavelength laser light source 1 emits a red laser light and an infrared laser light. The blue-violet laser light source 11 emits a blue-violet laser light. Further, a BD 60 is an optical disc having a protective substrate thickness of about 0.1 mm, a DVD 70 is an optical disc having a protective substrate thickness of 0.6 mm and a CD 80 is an optical disc having a protective substrate thickness of 1.2 mm. In this embodiment, the blue-violet laser light corresponds to an example of a third laser light.

First of all, the operation of the optical head 40 in the case of recording or reproducing information on or from the BD 60 is described. A blue-violet laser light having a wavelength of 405 nm and emitted from the blue-violet laser light source 11 is reflected by the dichroic prism 23. The dichroic prism 23 is formed to reflect blue-violet laser lights while transmitting red and infrared laser lights.

The blue-violet laser light reflected by the dichroic prism 23 passes through the beam splitter 13, is converted into substantially parallel light by the collimator lens 14 and bent by being reflected in a direction toward the BD 60 by the mirror 5. The blue-violet laser light reflected by the mirror 5 is focused as a light spot on an information recording layer of the BD 60 through the protective substrate by the objective lens 16.

The blue-violet laser light reflected by the information recording layer of the BD 60 passes through the objective lens 16 again and, after being reflected by the mirror 5, passes through the collimator lens 14. The blue-violet laser light having passed through the collimator lens 14 is reflected by the beam splitter 13 and pass through the holographic element 18 and the anomorphic lens 17 to be introduced to the light receiving element 20. The light receiving element 20 generates an information signal and a servo signal using the received blue-violet.

When the blue-violet laser light passes through the holographic element 18, $0^{th}$-order light and $\pm 1^{st}$-order diffraction lights are generated. The $\pm 1^{st}$-order diffraction lights generated by the holographic element 18 are detected in a specified light receiving area of the light receiving element 20 to be used for the generation of a tracking error signal.

Next, the operation of the optical head 40 in the case of recording or reproducing information on or from the DVD 70 or the CD 80 is described. A red laser light having a wavelength of 655 nm or an infrared laser light having a wavelength of 785 nm, which is emitted from the two-wavelength laser light source 1, is separated into a main beam as a $0^{th}$-order light and a sub beam as $\pm 1^{st}$-order diffraction lights by the diffraction grating 2. The main beam and the sub beam pass through the dichroic prism 23 and the beam splitter 13, are converted into substantially parallel lights by the collimator lens 14 and are bent by being reflected in a direction toward the DVD 70 or the CD 80 by the mirror 5. The two beams reflected by the mirror 5 are focused as light spots on an information recording layer of the DVD 70 or CD 80 through the protective substrate by the objective lens 16.

The main beam and sub beam reflected by the information recording layer of the DVD 70 or CD 80 pass through the objective lens 16 again, and pass through the collimator lens 14 after being reflected by the mirror 5. The two beams having passed through the collimator lens 14 are reflected by the beam splitter 13 and pass through the holographic element 18 and the anomorphic lens 17 to be introduced to the light receiving element 20. The light receiving element 20 generates an information signal and a servo signal using the received main beam and sub beam.

A tracking error signal is detected using a so-called three-beam method, differential push-pull method (DPP method) or the like using the main beam and sub beam generated by the diffraction grating 2.

Figure 21B:
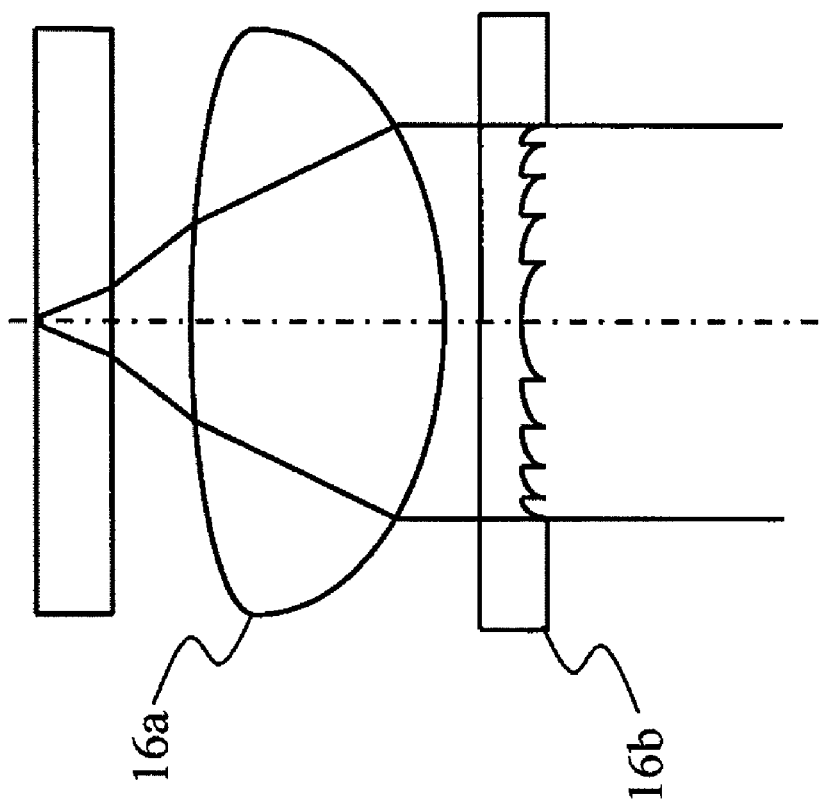
FIG. 21A is a schematic construction diagram of an objective lens according to the second embodiment of the invention and FIG. 21B is a schematic construction diagram of an objective lens according to a modification of the second embodiment of the invention.
Figure 21A:
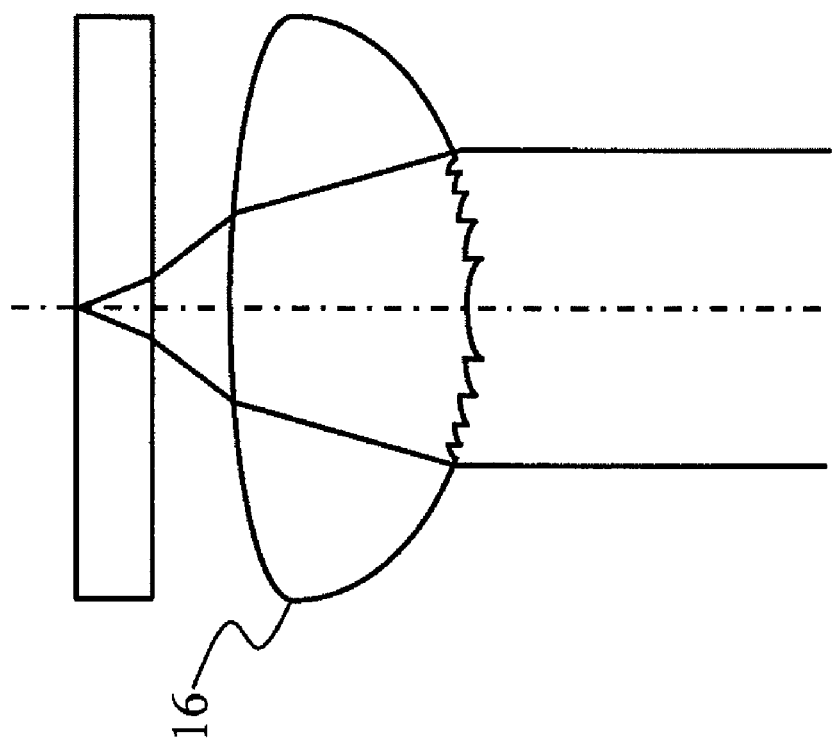

The objective lens 16 has a diffraction structure for focusing a blue-violet laser light for recording or reproducing information on or from the BD 60, a red laser light for recording or reproducing on or from the DVD 70 and an infrared laser light for recording or reproducing information on or from the CD 80 respectively as very small light spots, utilizing a wavelength difference. FIG. 21A is a schematic construction diagram of an objective lens according to the second embodiment of the present invention, and FIG. 21B is a schematic construction diagram of an objective lens according to a modification of the second embodiment of the present invention.

Specifically, as shown in FIG. 21A, a blazed diffraction structure having a serrated cross section is formed on at least one surface of the objective lens 16, e.g. an incident surface (surface toward the light source) of the objective lens 16 to deal with each of the BD 60, the DVD 70 and the CD 80. An aberration correction is applied to the blazed diffraction structure so that, on the BD 60, the DVD 70 and the CD 80 to have information recorded or reproduced by the laser lights of the respective laser lights, the laser lights of the respective wavelengths can be focused to diffraction limits together with the refractive power of the objective lens 16. The objective lens 16 having such a blazed diffraction structure for diffracting a part of the incident light can form light spots of the respective diffraction limits on optical discs having different protective substrate thicknesses.

The objective lens 16 is designed such that an area for focusing an infrared laser light on the CD 80 is limited to a lens central part including the optical axis, an area for focusing a red laser light on the DVD 70 is limited to the lens central part and an intermediate part outside the lens central part and an area for focusing a blue-violet laser light on the BD 60 includes the lens central part, the intermediate part and an outer part outside the intermediate part. Thus, it is possible to limit the NA for the CD 80 to about 0.45, to limit the NA for the DVD 70 to about 0.60 and increase the NA for the BD 60 to about 0.85.

The objective lens 16 is not limited to the one having the blazed diffraction structure formed on the incident surface thereof as shown in FIG. 21A. For example, as shown in FIG. 21B, the optical head may include an objective lens 16a having a refractive positive power and a separate hologram lens 16b and may record or reproduce information on or from the BD 60, the DVD 70 and the CD 80 by driving the objective lens 16a and the hologram lens 16b together. By using such a separate hologram lens 16b, it is not necessary to form a diffraction structure on a lens surface with a large angle of inclination and there is a merit of being easy to fabricate a mold.

The diffraction structure of the hologram lens 16b is not limited to the one formed on the surface toward the light source as shown in FIG. 21B and it is apparent that the diffraction structure may be formed, for example, on a surface toward the objective lens 16a or on both the surface toward the objective lens 16a and the surface toward the light source. It is obvious that the diffraction structure is not limited to the blazed type and similar effects can be obtained also by a step-shaped diffraction structure.

The objective lens 16 is not limited to the one having such a diffraction structure and may be a refractive objective lens utilizing wavelength dispersion characteristics of a plurality of glass materials or a combination lens obtained by combining a plurality of refractive lenses.

As described above, the optical head 40 of this embodiment can record or reproduce information by focusing laser lights having different wavelengths on different types of optical discs, e.g. the BD 60, the DVD 70 and CD 80 using one objective lens 16.

As shown in FIG. 20, in the optical head 40 of this embodiment, the two-wavelength laser light source 1 is arranged such that coma aberration can be corrected by tilting the objective lens 16 in a direction away from the stack ring similar to the optical head 30 of the first embodiment. Specifically, the emission point 1b of the infrared laser light is offset toward the outer peripheral side in the radial direction (X-direction) of the optical disc. Accordingly, third-order and fifth-order coma aberrations in the radial direction (X-direction) of the optical disc generated by off-axis incidence can be corrected and the contact of the stack ring and the objective lens 16 can be suppressed by tilting the objective lens 16 to locate the outer peripheral side in the radial direction of the optical disc higher than the inner peripheral side.

In the optical head 40 of this embodiment, the optical axis of the red laser light emitted from the two-wavelength laser light source 1 and that of the blue-violet laser light emitted form the blue-violet laser light source 11 are matched using the dichroic prism 23. Thus, the optical axis of the objective lens 16 and that of the blue-violet laser light coincide and no coma aberration generated by off-axis incidence occurs upon recording or reproducing information on or from the BD 60 and the DVD 70. In other words, the objective lens 16 needs not be tilted at the time of recording or reproducing information on or from the BD 60 and the DVD 70.

It is possible to simplify the optical construction of the optical head and to realize miniaturization and cost reduction by using a three-wavelength laser light source for emitting a blue-violet laser light, a red laser light and an infrared laser light.

Figure 22:
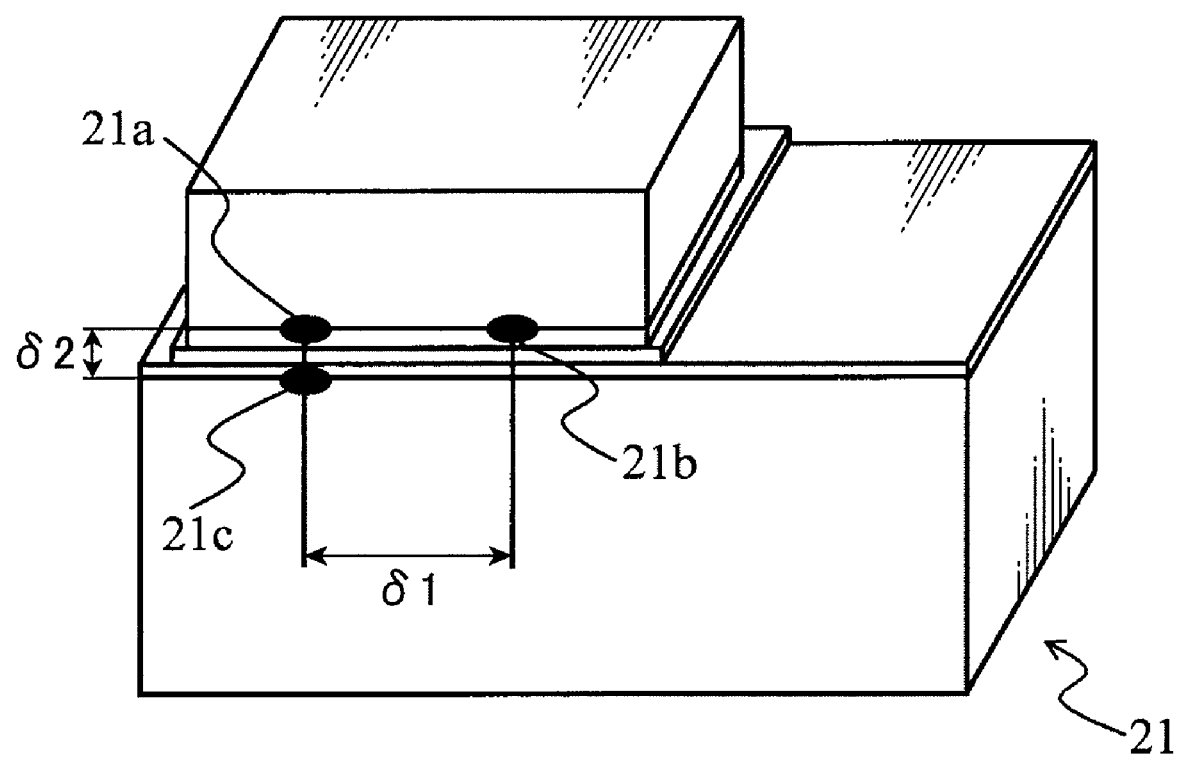
FIG. 22 is a diagram showing a state of emission points of a monolithic three-wavelength laser light source.

FIG. 22 is a diagram showing a state of emission points of a monolithic three-wavelength laser light source 21. Blue-violet, red and infrared laser lights are emitted from one laser chip. An emission point 21a for emitting a red laser light and an emission point 21b for emitting an infrared laser light are arranged at a specified distance δ1 from each other. An emission point 21c for emitting a blue-violet laser light is arranged in the proximity to the emission point 21a for emitting the red laser light, and the emission points 21c, 21a are arranged at a specified distance δ2 from each other. The distance δ1 between the emission points 21c (emission point 21a) and the emission point 21b is longer than the distance δ2 between the emission points 21c, 21a.

Figure 23:
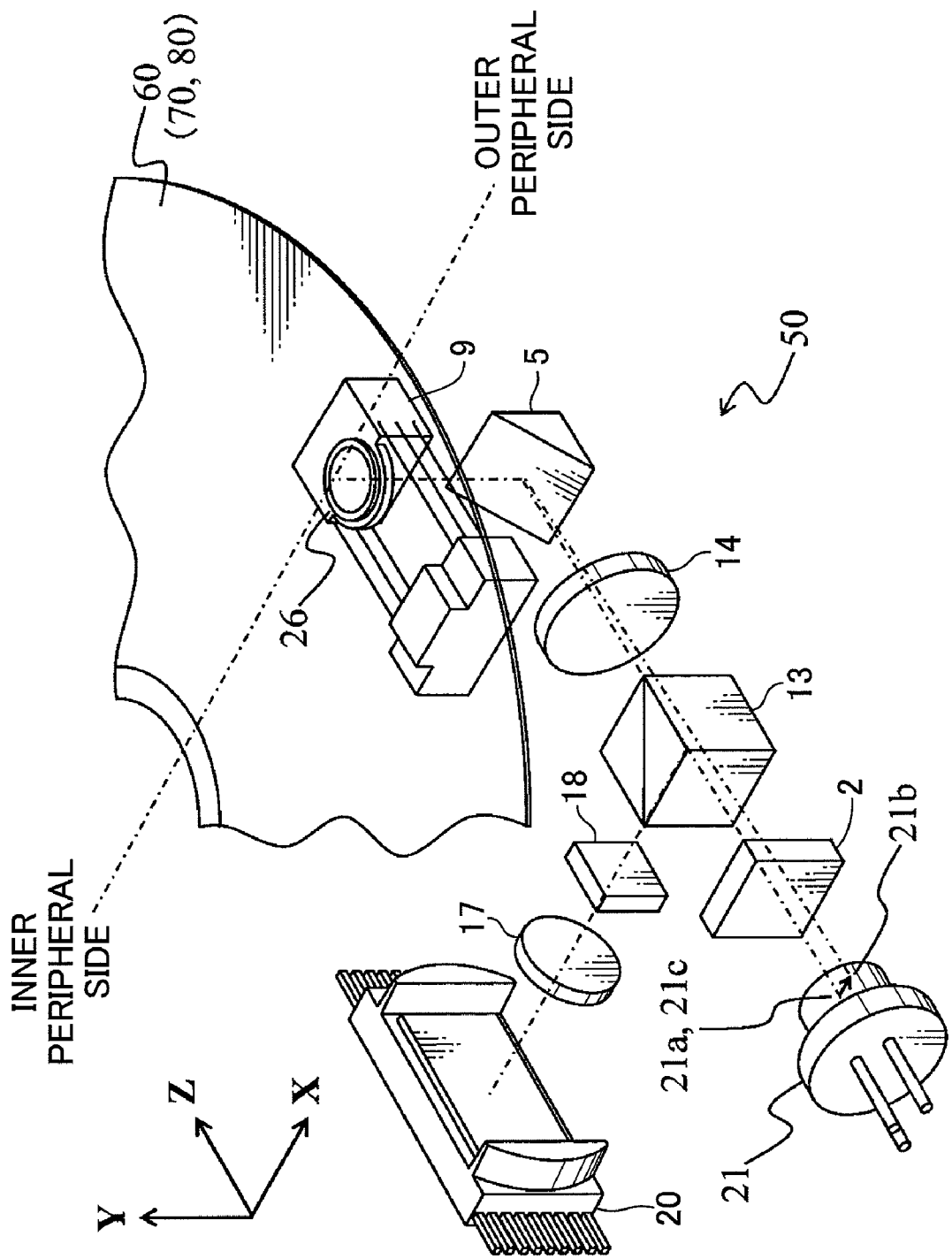
FIG. 23 is a schematic construction diagram of an optical head according to a modification of the second embodiment of the invention.

An exemplary construction of an optical head 50 using such a three-wavelength laser light source 21 is shown in FIG. 23. FIG. 23 is a schematic construction diagram of the optical head according a modification of the second embodiment of the present invention. In FIG. 23, the optical head 50 is provided with a three-wavelength laser light source 21, a diffraction grating 2, a beam splitter 13, a collimator lens 14, a mirror 5, an objective lens 26, an anomorphic lens 17, a holographic element 18, an objective lens actuator 9 and a light receiving element 20. The three-wavelength laser light source 21 emits a blue-violet laser light, a red laser light and an infrared laser light.

Since the optical axis of the red laser light emitted from the three-wavelength laser light source 21 substantially coincides with that of the blue-violet laser light in the optical head 50 shown in FIG. 23, the optical axis of the objective lens 26, that of the red laser light and that of the blue-violet laser light coincide in the objective lens 26, wherefore no coma aberration caused by off-axis incidence occur upon recording or reproducing information on or from the BD 60 and the DVD 70. In other words, the objective lens 26 needs not be tilted at the time of recording or reproducing information on or from the BD 60 and the DVD 70.

On the other hand, the emission point 21b of the infrared laser light is offset toward the outer peripheral side in the radial direction (X-direction) of the optical disc. Accordingly, third-order and fifth-order coma aberrations in the radial direction (X-direction) of the optical disc generated by off-axis incidence can be corrected and the contact of the stack ring and the objective lens 26 can be suppressed by tilting the objective lens 26 to locate the outer peripheral side in the radial direction of the optical disc higher than the inner peripheral side.

Figure 24:
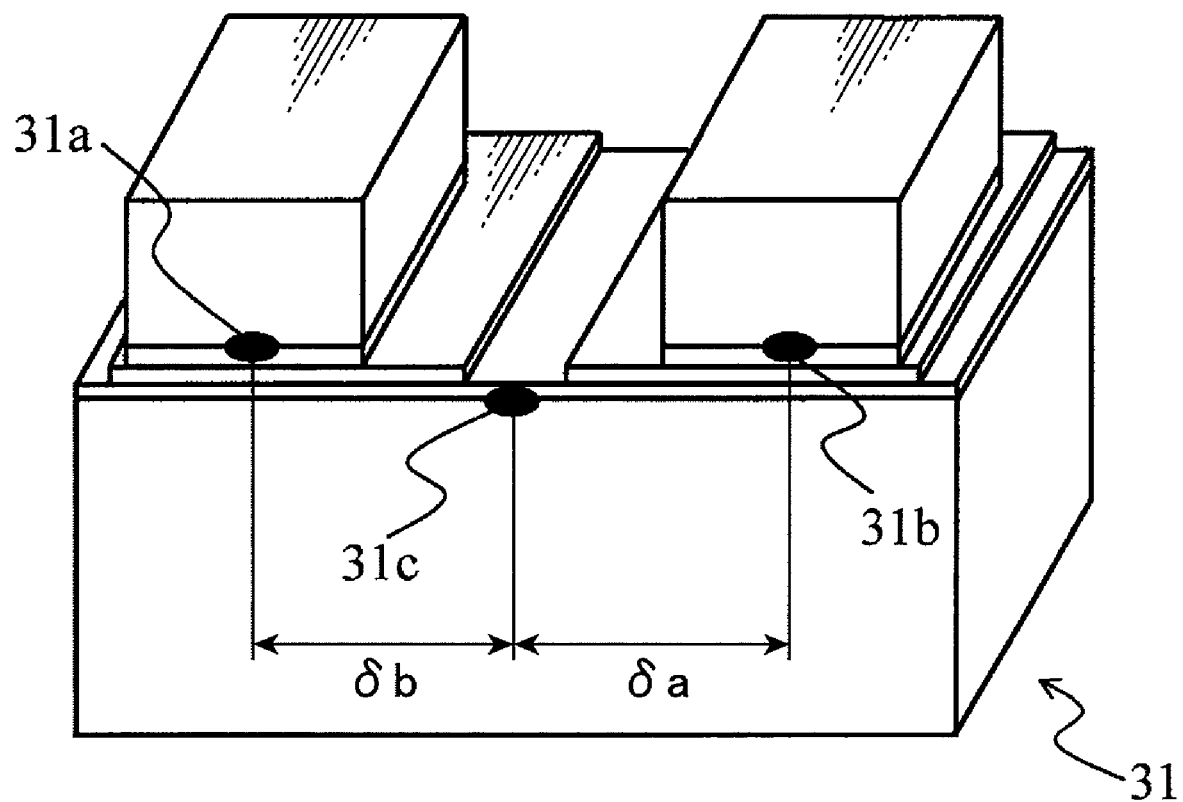
FIG. 24 is a diagram showing a state of emission points of another monolithic three-wavelength laser light source.

The emission points of the three-wavelength laser light source for emitting the blue-violet laser light, the red laser light and the infrared laser light are not limited to the arrangement shown in FIG. 22 and the present invention is applicable even with an arrangement, for example, shown in FIG. 24. FIG. 24 is a diagram showing a state of emission points of another monolithic three-wavelength laser light source.

In the three-wavelength laser light source 31 shown in FIG. 24, an emission point 31a for emitting a red laser light and an emission point 31b for emitting an infrared laser light are arranged at a specified distance from each other with an emission point 31c for emitting a blue-violet laser light in the middle.

In the optical head using such a three-wavelength laser light source 31, the optical axis of an objective lens coincides with that of the blue-violet laser light. Thus, no coma aberration caused by off-axis incidence occurs upon recording or reproducing information on or from the BD 60 since the optical axis of the objective lens and that of the blue-violet laser light coincide. In other words, the objective lens needs not be tilted at the time of recording or reproducing information on or from the BD 60. On the other hand, by arranging the emission points 31a, 31b of the red and infrared laser lights to offset in the radial direction of the optical disc, third-order and fifth-order coma aberrations generated by off-axis incidence can be corrected by tilting the objective lens 26 in the radial direction of the optical disc.

For example, the emission point 31b of the infrared laser light is offset toward the outer peripheral side in the radial direction (X-direction) of the optical disc, and the emission point 31a of the red laser light is offset toward the inner peripheral side in the radial direction (X-direction) of the optical disc. At this time, the polarities of the third-order coma aberrations generated by off-axis incidence at the time of recording or reproducing information on or from the CD 80 and the DVD 70 are opposite. However, the objective lens is designed such that the polarities of the coma aberrations generated by tilting the objective lens in a specified direction are opposite at the time of recording or reproducing information on or from the CD 80 and at the time of recording or reproducing information on or from the DVD 70. Thus, for both the CD 80 and the DVD 70, the third-order coma aberrations generated by off-axis incidence in the radial direction (X-direction) can be corrected and the contact of the stack ring and the objective lens can be suppressed by tilting the objective lens to locate the outer peripheral end of the objective lens in the radial direction higher than the inner peripheral end thereof.

The objective lens actuator 9 tilts the objective lens 26 to locate the inner peripheral end of the objective lens 26 in the radial direction of the CD 80 lower than the outer peripheral end thereof upon focusing the infrared laser light on an information recording layer of the CD 80. Further, the objective lens actuator 9 tilts the objective lens 26 to locate the inner peripheral end of the objective lens 26 in the radial direction of the DVD 70 lower than the outer peripheral end thereof upon focusing the red laser light on an information recording layer of the DVD 70.

Thus, the coma aberration of the infrared laser light and that of the red laser light generated in a direction opposite to that of the coma aberrations of the infrared laser light can be corrected by tilting the objective lens 26 to locate the inner peripheral end of the objective lens 26 in the radial direction of the optical disc lower than the outer peripheral end thereof.

Specifically, the three-wavelength laser light source 31 of this embodiment is arranged such that a laser light is incident from an outer peripheral side of the optical disc relative to the optical axis of the objective lens 26 when the following Equation (8) is satisfied.

$$1.0 \geq (CMD1+CML1) \times \arctan(\delta a/fcl)/CML1 > 0 \quad (8)$$

In the above Equation (8), it is assumed that CMD1 (m$\lambda$/°) denotes a third-order coma aberration amount generated by the tilt of the CD 80 per unit angle, CML1 (m$\lambda$/°) a third-order coma aberration amount generated by the tilt of the objective lens per unit angle at the time of recording or reproducing information on or from the CD 80, $\delta$a (mm) a distance between the emission points of blue-violet and infrared laser lights and fcl (mm) the focal length of the collimator lens.

The three-wavelength laser light source 31 of this embodiment is arranged such that a laser light is incident from the inner peripheral side of the optical disc relative to the optical axis of the objective lens 26 when the following Equations (9) and (10) are satisfied.

$$(CMD2+CML2) \times \arctan(\delta b/fcl)/CML2 \geq -1.0 \quad (9)$$

$$(CMD2+CML2) \times \arctan(\delta b/fcl) \geq 10 \quad (10)$$

In the above Equations (9) and (10), it is assumed that CMD2 (m$\lambda$/°) denotes a third-order coma aberration amount generated by the tilt of the DVD 70 per unit angle, CML2 (m$\lambda$/°) a third-order coma aberration amount generated by the tilt of the objective lens per unit angle at the time of recording or reproducing information on or from the DVD 70, $\delta$b (mm) a distance between the emission points of blue-violet and red laser lights and fcl (mm) the focal length of the collimator lens.

Thus, if an infrared laser light is incident from the outer peripheral side of the CD 80 relative to the optical axis of the objective lens 26, the objective lens 26 can be tilted to locate the inner peripheral end of the objective lens 26 in the radial direction of the CD 80 lower than the outer peripheral end thereof by satisfying the above Equation (8). Further, if a red laser light is incident from the inner peripheral side of the DVD 70 relative to the optical axis of the objective lens 26, the objective lens 26 can be tilted to locate the inner peripheral end of the objective lens 26 in the radial direction of the DVD 70 lower than the outer peripheral end thereof by satisfying the above Equations (9) and (10).

As described above, the optical head according to the first or second embodiment can obtain a profound effect of improving recording or reproduction performances by tilting the objective lens to minimize, for example, the third-order coma aberration, the fifth-order coma aberration or the total wavefront aberration even if the coma aberration occurs due to the off-axis incidence of at least one laser light on the objective lens out of the laser lights emitted from the two-wavelength laser light source or the three-wavelength laser light source.

Further, the optical head according to the first or second embodiment can correct the generated coma aberration by tilting the objective lens even in the case of using an objective lens which generates third-order or fifth-order coma aberration in the case of off-axis incidence on the objective lens, i.e. does not satisfy a so-called sine condition. Thus, a degree of freedom in designing a coma aberration amount at the time of off-axis incidence in the design of an objective lens for recording or reproducing information by focusing laser lights having different wavelengths on different types of optical discs, wherefore an objective lens with better aberration performance can be employed.

Third Embodiment

Figure 25:
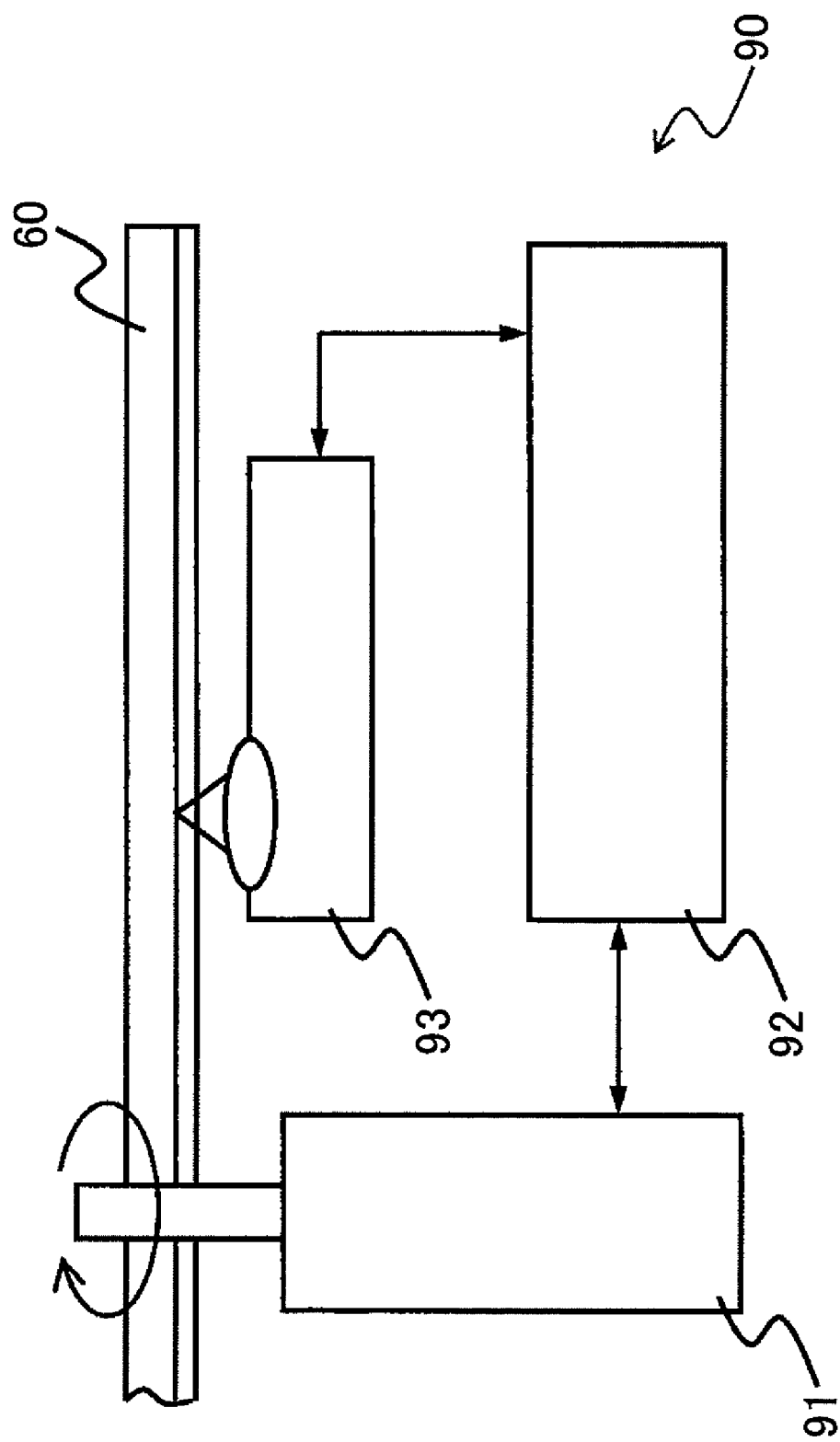
FIG. 25 is a schematic construction diagram of an optical disc device according to a third embodiment of the invention.

FIG. 25 is a schematic construction diagram of an optical disc device according to a third embodiment of the present invention.

In FIG. 25, an optical disc device 90 is internally provided with an optical disc driver 91, a control unit 92 and an optical head 93. Although a BD 60 as an optical disc is used in this embodiment, it can be replaced by a DVD 70 or a CD 80.

The optical disc driver 91 rotates and drives the BD 60 (or DVD 70, CD 80). In this embodiment, the optical disc driver 91 corresponds to an example of a motor. The optical head 93 is any one of the optical heads according to the first and second embodiments. The control unit 92 has a function of driving and controlling the optical disc driver 91 and the optical head 93, a function of processing a control signal and an information signal received by the optical head 93 and a function of interfacing the information signal between the outside and inside of the optical head 93.

The optical disc device 90 includes any one of the optical heads according to the first and second embodiments. Thus, the optical disc device 90 of this embodiment can correct coma aberration generated due to different positions of emission points of a plurality of laser lights having different wavelengths. Further, the optical disc device 90 can satisfactorily record or reproduce information on or from optical discs corresponding to a plurality of laser lights.

Fourth Embodiment

Figure 26:
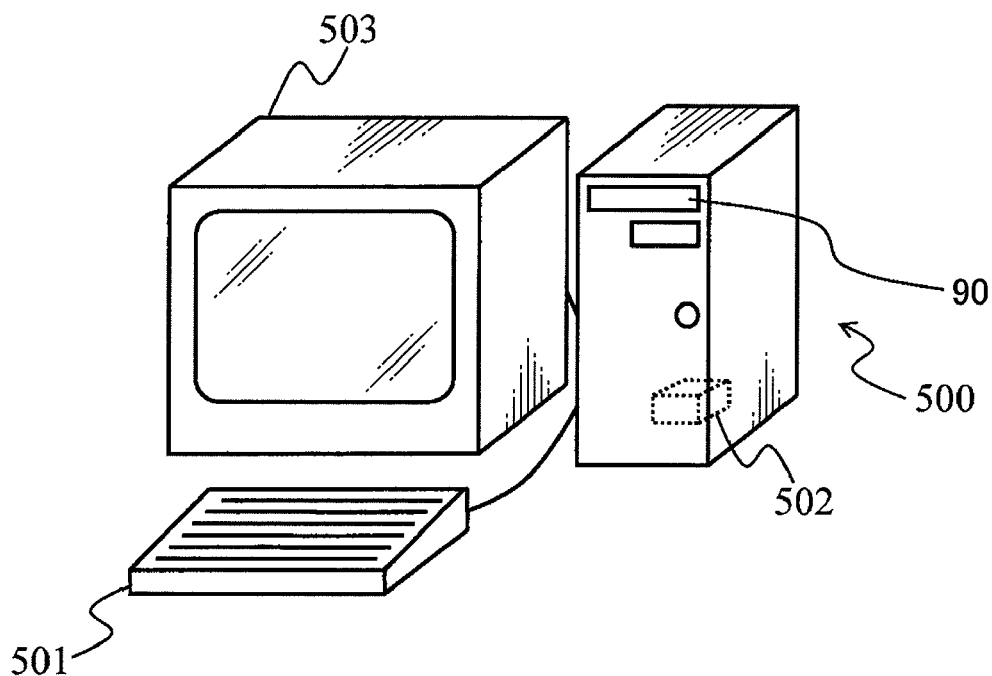
FIG. 26 is a schematic construction diagram of a computer according to a fourth embodiment of the invention.

FIG. 26 is a schematic construction diagram of a computer according to a fourth embodiment of the present invention.

In FIG. 26, a computer 500 is provided with the optical disc device 90 according to the third embodiment, an input unit 501 such as a keyboard, a mouse or a touch panel for the input of information, an arithmetic unit 502 such as a central processing unit (CPU) for computation based on information inputted from the input unit 501 or information read from the optical disc device 90 and an output unit 503 such as a cathode ray tube or a liquid crystal display device for displaying information such as the computational result of the arithmetic unit 502 or a printer for printing information such as the computational result of the arithmetic unit 502.

Since the computer 500 includes the optical disc device 90 according to the third embodiment, coma aberration generated due to different positions of emission points of a plurality of laser lights having different wavelengths can be corrected. Further, the computer 500 can satisfactorily record or reproduce information on or from different types of optical discs and can have a wide range of application.

Fifth Embodiment

Figure 27:
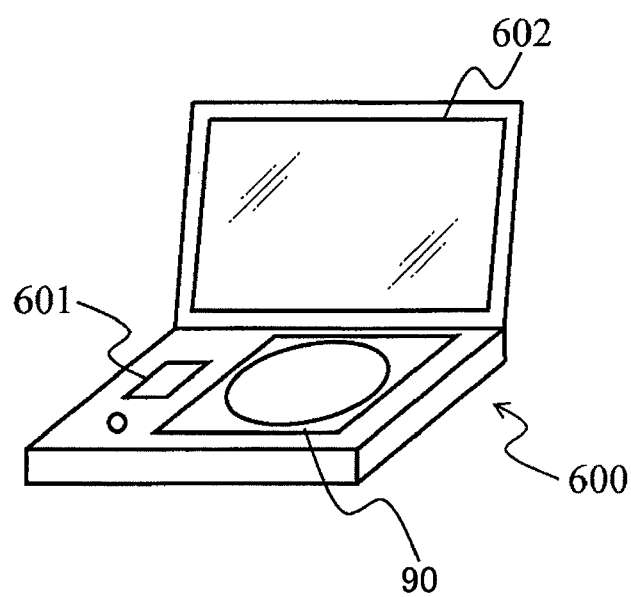
FIG. 27 is a schematic construction diagram of an optical disc player according to a fifth embodiment of the invention.

FIG. 27 is a schematic construction diagram of an optical disc player according to a fifth embodiment of the present invention.

In FIG. 27, an optical disc player 600 is provided with the optical disc device 90 according to the third embodiment, and an information/image converter 601 such as a decoder for converting an information signal obtained from the optical disc device 90 into an image signal.

The optical disc player 600 is also usable as a car navigation system by adding a position sensor such as a GPS (Global Positioning System) or a central processing unit (CPU). It is also possible to add a display device 602 such as a liquid crystal monitor.

Since the optical disc player 600 includes the optical disc device 90 according to the third embodiment, coma aberration generated due to different positions of emission points of a plurality of laser lights having different wavelengths can be corrected. Further, the optical disc player 600 can satisfactorily record or reproduce information on or from different types of optical discs and can have a wide range of application.

Sixth Embodiment

Figure 28:
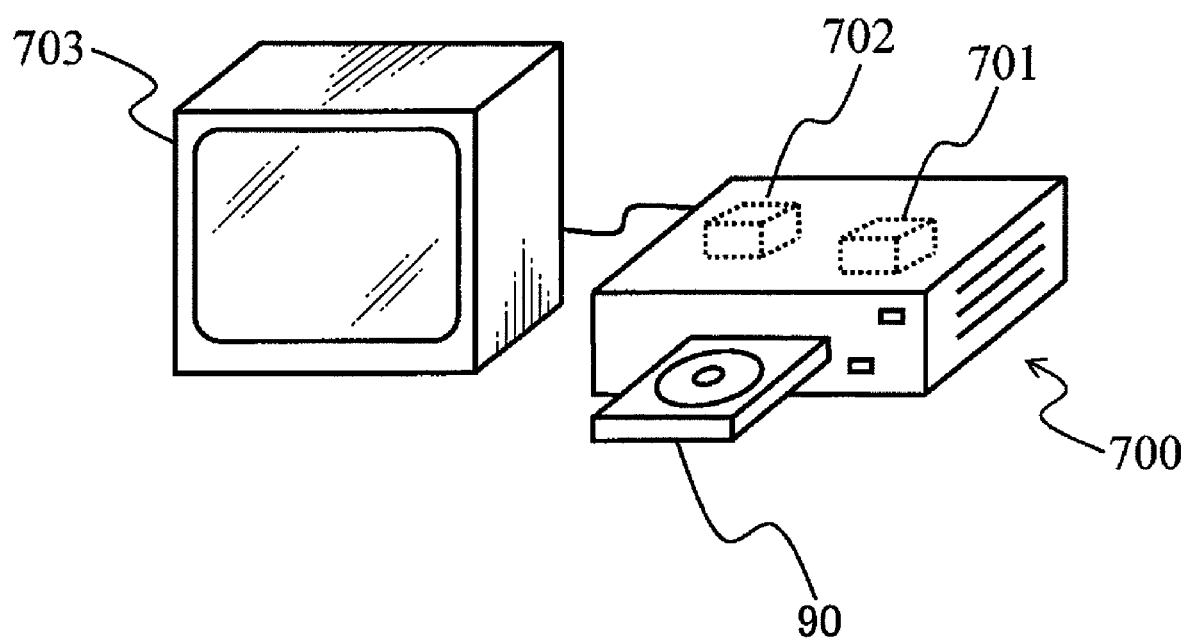
FIG. 28 is a schematic construction diagram of an optical disc recorder according to a sixth embodiment of the invention.
Figure 29:
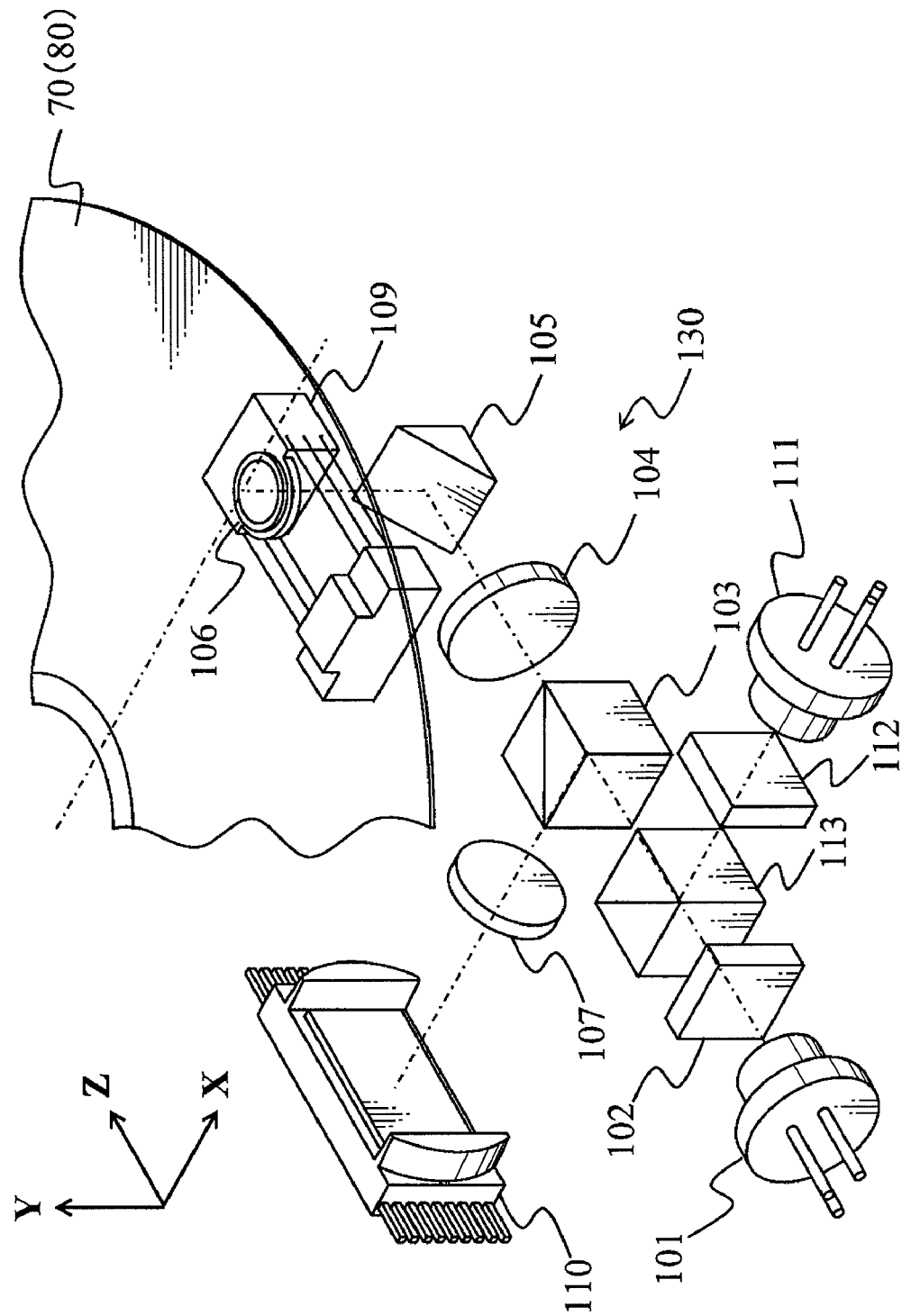
FIG. 29 is a schematic construction diagram of a conventional optical head.
Figure 30:
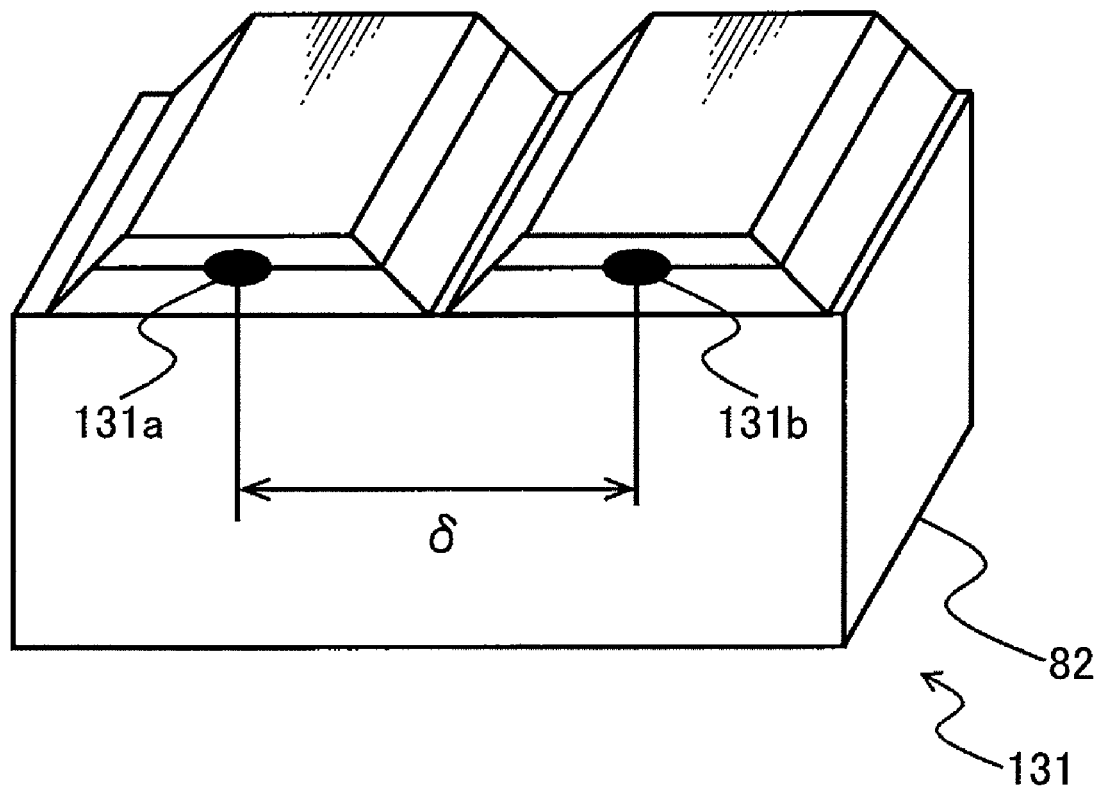
FIG. 30 is a diagram showing a state of emission points of a monolithic two-wavelength laser light source.

FIG. 28 is a schematic construction diagram of an optical disc recorder according to a sixth embodiment of the present invention.

In FIG. 28, an optical disc recorder 700 is provided with the optical disc device 90 according to the third embodiment, and an image/information converter 701 such as an encoder for converting image information into an information signal to be recorded on an optical disc by the optical disc device 90. Preferably, by also including an information/image converter 702 such as a decoder for converting an information signal obtained from the optical disc device 90 into an image signal, the optical disc recorder 700 can reproduce a recorded image. The optical disc recorder 700 may also include an output unit 703 such as a cathode ray tube or a liquid crystal display device for displaying information or a printer for printing information.

Since the optical disc recorder 700 includes the optical disc device 90 according to the third embodiment, coma aberration generated due to different positions of emission points of a plurality of laser lights having different wavelengths can be corrected. Further, the optical disc recorder 700 can satisfactorily record or reproduce information on or from different types of optical discs and can have a wide range of application.

The above specific embodiments mainly embrace inventions having the following constructions.

An optical head according to one aspect of the present invention comprises a light source for emitting a first laser light having a first wavelength and a second laser light having a second wavelength different form the first wavelength; an objective lens for focusing the first laser light on an information recording layer of a first information recording medium and focusing the second laser light on an information recording layer of a second information recording medium different from the first information recording medium; and an objective lens driver for tilting the objective lens in a direction to decrease coma aberration generated by the incidence of the first laser light oblique to the optical axis of the objective lens when the objective lens focuses the first laser light on the information recording layer of the first information recording medium, wherein the light source is arranged to correct the coma aberration generated in a radial direction of the first information recording medium when the objective lens is tilted to locate an inner peripheral end thereof in the radial direction of the first information recording medium lower than an outer peripheral end thereof; and the objective lens driver tilts the objective lens to locate the inner peripheral end of the objective lens in the radial direction of the first information recording medium lower than the outer peripheral end thereof.

According to this construction, the light source is arranged to correct the coma aberration generated in the radial direction of the first information recording medium when the objective lens is tilted to locate the inner peripheral end thereof in the radial direction of the first information recording medium lower than the outer peripheral end thereof. The objective lens driver tilts the objective lens to locate the inner peripheral end of the objective lens in the radial direction of the first information recording medium lower than the outer peripheral end thereof.

Thus, the coma aberration generated due to different positions of emission points of a plurality of laser lights having different wavelengths can be corrected. Since the objective lens is tilted to locate the inner peripheral end of the objective lens in the radial direction of the first information recording medium lower than the outer peripheral end thereof, it can correct the coma aberration without coming into contact with a stack ring provided at the inner peripheral side of the first information recording medium.

In the above optical head, the light source is preferably arranged such that the optical axis of the second laser light substantially coincides with that of the objective lens.

According to this construction, it is not necessary to correct the coma aberration for the second laser light and it is sufficient to correct only the coma aberration of the first laser light since the light source is arranged such that the optical axis of the second laser light and that of the objective lens substantially coincide.

In the above optical head, the first wavelength is preferably longer than the second wavelength.

According to this construction, it is possible to use an infrared laser light as the first laser light having the first wavelength and a red laser light as the second laser light having the second wavelength since the first wavelength is longer than the second wavelength.

In the above optical head, it is preferable that a collimator lens for converting the first and second laser lights into substantially parallel lights is further provided; and that the light source is arranged such that the first laser light is incident from an outer peripheral side of the first information recording medium relative to the optical axis of the objective lens when the following Equation (11) is satisfied if CMD (mλ/°) denotes a third-order coma aberration amount generated by the tilt of the first information recording medium per unit angle, CML (mλ/°) a third-order coma aberration amount generated by the tilt of the objective lens per unit angle, δ (mm) a distance between emission points of the first and second laser lights and fcl (mm) the focal length of the collimator lens:

$$1.0 \geq (CMD+CML) \times \arctan(\delta/fcl)/CML > 0 \tag{11}$$

According to this construction, the light source is arranged such that the first laser light is incident from the outer peripheral side of the first information recording medium relative to the optical axis of the objective lens when the following Equation (11) is satisfied.

Thus, if the first laser light is incident from the outer peripheral side of the first information recording medium relative to the optical axis of the objective lens, the objective lens can be tilted to locate the inner peripheral end of the objective lens in the radial direction of the first information recording medium lower than the outer peripheral end thereof by satisfying the above Equation (11).

In the above optical head, it is preferable that a collimator lens for converting the first and second laser lights into substantially parallel lights is further provided; and that the light source is arranged such that the first laser light is incident form an inner peripheral side of the first information recording medium relative to the objective lens when the following Equations (12) and (13) are satisfied if CMD (mλ/°) denotes a third-order coma aberration amount generated by the tilt of the first information recording medium per unit angle, CML (mλ/°) a third-order coma aberration amount generated by the tilt of the objective lens per unit angle, δ (mm) a distance between emission points of the first and second laser lights and fcl (mm) the focal length of the collimator lens:

$$(CMD+CML) \times \arctan(\delta/fcl)/CML \geq -1.0 \tag{12}$$

$$(CMD+CML) \times \arctan(\delta/fcl) \geq 10 \tag{13}$$

According to this construction, the light source is arranged such that the first laser light is incident form the inner peripheral side of the first information recording medium relative to the objective lens when the following Equations (12) and (13) are satisfied.

Thus, if the first laser light is incident from the inner peripheral side of the first information recording medium relative to the optical axis of the objective lens, the objective lens can be tilted to locate the inner peripheral end of the objective lens in the radial direction of the first information recording medium lower than the outer peripheral end thereof by satisfying the above Equations (12) and (13).

In the above optical head, it is preferable that the light source is arranged such that coma aberration caused by the incidence of the second laser light oblique to the optical axis of the objective lens is generated in a radial direction of the second information recording medium; that a direction of the coma aberration generated in the radial direction of the second information recording medium is opposite to that of the coma aberration generated in the radial direction of the first information recording medium; and that the objective lens driver tilts the objective lens in a direction to decrease the coma aberration generated by the incidence of the second laser light oblique to the optical axis of the objective lens when the objective lens focuses the second laser light on the information recording layer of the second information recording medium.

According to this construction, the coma aberration caused by the incidence of the second laser light oblique to the optical axis of the objective lens is generated in the radial direction of the second information recording medium, and the direction of the coma aberration generated in the radial direction of the second information recording medium is opposite to that of the coma aberration generated in the radial direction of the first information recording medium. The objective lens driver tilts the objective lens in the direction to decrease the coma aberration generated by the incidence of the second laser light oblique to the optical axis of the objective lens when the objective lens focuses the second laser light on the information recording layer of the second information recording medium.

Thus, it is possible to correct not only the coma aberration generated by the incidence of the first laser light oblique to the optical axis of the objective lens, but also the coma aberration generated by the incidence of the second laser light oblique to the optical axis of the objective lens and generated in the direction opposite to the coma aberration of the first laser light.

In the above optical head, it is preferable that the light source further emits a third laser light having a third wavelength different from the first and second wavelengths; that an emission point of the third laser light is arranged between the emission points of the first and second laser lights; and that the optical axis of the third laser light substantially coincides with that of the objective lens.

According to this construction, the emission point of the third laser light is arranged between the emission points of the first and second laser lights and the optical axis of the third laser light substantially coincides with that of the objective lens, wherefore it is not necessary to correct the coma aberration for the third laser light and it is sufficient to correct only the coma aberrations of the first and second laser lights.

In the above optical head, the objective lens driver preferably tilts the objective lens to locate the inner peripheral end of the objective lens in the radial direction of the first information recording medium lower than the outer peripheral end thereof when the objective lens focuses the first laser light on the information recording layer of the first information recording medium while tilting the objective lens to locate the inner peripheral end of the objective lens in the radial direction of the second information recording medium lower than the outer peripheral end thereof when the objective lens focuses the second laser light on the information recording layer of the second information recording medium.

According to this construction, the objective lens is tilted to locate the inner peripheral end of the objective lens in the radial direction of the first information recording medium lower than the outer peripheral end thereof when the objective lens focuses the first laser light on the information recording layer of the first information recording medium. Further, the objective lens is tilted to locate the inner peripheral end of the objective lens in the radial direction of the second information recording medium lower than the outer peripheral end thereof when the objective lens focuses the second laser light on the information recording layer of the second information recording medium.

Thus, the optical axis of the third laser light and that of the objective lens substantially coincide, and the coma aberration of the first laser light and that of the second laser light generated in the direction opposite to the coma aberration of the first laser light can be corrected by tilting the objective lens to locate the inner peripheral end of the objective lens in the radial direction of the first information recording medium lower than the outer peripheral end thereof.

In the above optical head, it is preferable that a collimator lens for converting the first and second laser lights into substantially parallel lights is further provided; and that the light source is arranged such that the first laser light is incident from an outer peripheral side of the first information recording medium relative to the optical axis of the objective lens when the following Equation (14) is satisfied while being arranged such that the second laser light is incident form an inner peripheral side of the second information recording medium relative to the optical axis of the objective lens when the following Equations (15) and (16) are satisfied if $CMD1$ ($m\lambda/°$) denotes a third-order coma aberration amount generated by the tilt of the first information recording medium per unit angle, $CML1$ ($m\lambda/°$) a third-order coma aberration amount generated by the tilt of the objective lens per unit angle at the time of recording or reproducing information on or from the first information recording medium, $CMD2$ ($m\lambda/°$) a third-order coma aberration amount generated by the tilt of the second information recording medium per unit angle, $CML2$ ($m\lambda/°$) a third-order coma aberration amount generated by the tilt of the objective lens per unit angle at the time of recording or reproducing information on or from the second information recording medium, $\delta a$ (mm) a distance between emission points of the third and first laser lights in the light source, $\delta b$ (mm) a distance between emission points of the third and second laser lights in the light source and $fcl$ (mm) the focal length of the collimator lens:

$$1.0 \geq (CMD1+CML1) \times \arctan(\delta a/fcl)/CML1 > 0 \qquad (14)$$

$$(CMD2+CML2) \times \arctan(\delta b/fcl)/CML2 \geq -1.0 \qquad (15)$$

$$(CMD2+CML2) \times \arctan(\delta b/fcl) \geq 10 \qquad (16).$$

According to this construction, the light source is arranged such that the first laser light is incident from the outer peripheral side of the first information recording medium relative to the optical axis of the objective lens when the Equation (14) is satisfied while being arranged such that the second laser light is incident form the inner peripheral side of the second information recording medium relative to the objective lens when the Equations (15) and (16) are satisfied.

Thus, if the first laser light is incident from the outer peripheral side of the first information recording medium relative to the optical axis of the objective lens, the objective lens can be tilted to locate the inner peripheral end of the objective lens in the radial direction of the first information recording medium lower than the outer peripheral end thereof by satisfying the above Equation (14). Further, if the second laser light is incident from the inner peripheral side of the second information recording medium relative to the optical axis of the objective lens, the objective lens can be tilted to locate the inner peripheral end of the objective lens in the radial direction of the second information recording medium lower than the outer peripheral end thereof by satisfying the above Equations (15) and (16).

In the above optical head, it is preferable that the light source further emits a third laser light having a third wavelength different from the first and second wavelengths; that a distance between the emission points of the third and first laser lights is longer than a distance between the emission points of the third and second laser lights; and that the optical axis of the third laser light substantially coincides with that of the objective lens.

According to this construction, the light source further emits the third laser light having the third wavelength different from the first and second wavelengths in addition to the first and second laser lights. In this case, the respective emission points of the first to third laser lights are set such that the distance between the emission points of the third and first laser lights is longer than that between the emission points of the third and second laser lights and the optical axis of the third laser light substantially coincides with that of the objective lens.

Thus, the optical axis of the second laser light and that of the objective lens can substantially coincide by decreasing the distance between the optical axis of the second laser light and that of the third laser light and substantially matching the optical axis of the third laser light and that of the objective lens. Therefore, it is not necessary to correct the coma aberration of the second laser light and that of the third laser light and it is sufficient to correct only the coma aberration of the first laser light.

In the above optical head, it is preferable that the light source includes a first light source for emitting the first and second laser lights and a second light source for emitting the third laser light having the third laser light different from the first and second wavelengths; and that the optical axis of the third laser light, that of the second laser light and that of the objective lens substantially coincide.

According to this construction, the first light source emits the first and second laser lights and the second light source emits the third laser light having the third wavelength different from the first and second wavelengths. The optical axis of the third laser light, that of the second laser light and that of the objective lens substantially coincide.

Thus, by substantially matching the optical axis of the third laser light, that of the second laser light and that of the objective lens, it is not necessary to correct the coma aberration of the second laser light and that of the third laser light and it is sufficient to correct only the coma aberration of the first laser light.

In the above optical head, it is preferable that the first wavelength is longer than the second wavelength and that the second wavelength is longer than the third wavelength.

According to this construction, since the first wavelength is longer than the second wavelength and the second wavelength is longer than the third wavelength, it is possible to use an infrared laser light as the first laser light having the first wavelength, a red laser light as the second laser light having the second wavelength and a blue-violet laser light as the third laser light having the third wavelength.

In the above optical head, in the case of focusing the first laser light on an information recording layer of the first information recording medium, the objective lens preferably satisfies $1.0 \geq (CMD+CML) \times \alpha/CML$ if CMD (m$\lambda$/°) denotes a third-order coma aberration amount generated by the tilt of the first information recording medium per unit angle, CML (m$\lambda$/°) a third-order coma aberration amount generated by the tilt of the objective lens per unit angle and $\alpha$ (°) an angle between the optical axis of the objective lens and that of the first laser light emitted from the light source.

According to this construction, the objective lens can be prevented from coming into contact with the information recording medium upon being tilted by setting an objective lens tilting amount (($CMD+CML) \times \alpha/CML$) to or below 1.0°.

In the above optical head, it is preferable that coma aberration generated by the incidence of the first laser light oblique to the optical axis of the objective lens includes at least third-order coma aberration and fifth-order coma aberration; and the objective lens driver tilts the objective lens to substantially zero the third-order coma aberration.

According to this construction, the fifth-order coma aberration can also be suppressed by tilting the objective lens to substantially zero the third-order coma aberration out of the third-order and fifth-order coma aberrations.

In the above optical head, it is preferable that coma aberration generated by the incidence of the first laser light oblique to the optical axis of the objective lens includes at least third-order coma aberration and fifth-order coma aberration; and the objective lens driver tilts the objective lens to make the absolute value of the third-order coma aberration smaller than that of the fifth-order coma aberration.

According to this construction, both the third-order coma aberration and the fifth-order coma aberration can be suppressed since the objective lens is tilted to make the absolute value of the third-order coma aberration smaller than that of the fifth-order coma aberration.

In the above optical head, it is preferable that coma aberration generated by the incidence of the first laser light oblique to the optical axis of the objective lens includes at least third-order coma aberration and fifth-order coma aberration; and the objective lens driver tilts the objective lens to make the absolute value of the third-order coma aberration substantially equal to that of the fifth-order coma aberration.

According to this construction, total wavefront aberration can be minimized and a reduction in peak intensity can be suppressed since the objective lens is tilted to make the absolute value of the third-order coma aberration substantially equal to that of the fifth-order coma aberration.

In the above optical head, it is preferable that a disc discriminator for discriminating the type of an unknown information recording medium is further provided; and that the disc discriminator discriminates whether or not the unknown information recording medium to have information recorded thereon or reproduced therefrom is the second information recording medium with the tilt of the objective lens substantially set to zero.

According to this construction, it is discriminated whether or not the unknown information recording medium to have information recorded thereon or reproduced therefrom is the second information recording medium with the tilt of the objective lens substantially set to zero. Since the optical axis of the second laser light and that of the objective lens substantially coincide, whether or not the unknown information recording medium is the second information recording medium can be accurately discriminated by setting the tilt of the objective lens substantially to zero.

In the above optical head, it is preferable that a disc discriminator for discriminating the type of an unknown information recording medium is further provided; and that the disc discriminator discriminates whether or not the unknown information recording medium to have information recorded thereon or reproduced therefrom is the first information recording medium after changing the tilt of the objective lens in a direction to maximally decrease coma aberration generated by the incidence of the first laser light oblique to the optical axis of the objective lens.

According to this construction, it is discriminated whether or not the unknown information recording medium to have information recorded thereon or reproduced therefrom is the first information recording medium after changing the tilt of the objective lens in the direction to maximally decrease the coma aberration generated by the incidence of the first laser light oblique to the optical axis of the objective lens. Since the first laser light is incident oblique to the optical axis of the objective lens, whether or not the unknown information recording medium is the first information recording medium can be accurately discriminated by changing the tilt of the objective lens in the direction to maximally decrease the coma aberration.

In the above optical head, it is preferable that a disc discriminator for discriminating the type of an unknown information recording medium is further provided; and that the disc discriminator discriminates the type of the unknown information recording medium to have information recorded thereon or reproduced therefrom after changing the tilt of the objective lens in a direction to decrease coma aberration generated by the incidence of the first laser light oblique to the optical axis of the objective lens.

According to this construction, it is discriminated the type of the unknown information recording medium to have information recorded thereon or reproduced therefrom after changing the tilt of the objective lens in the direction to decrease the coma aberration generated by the incidence of the first laser light oblique to the optical axis of the objective lens. Therefore, the type of the unknown information recording medium, i.e. whether it is the first information recording medium or the second information recording medium can be accurately discriminated by changing the tilt of the objective lens in the direction to decrease the coma aberration.

An optical disc device according to another aspect of the present invention comprises any one of the above optical heads, a motor for rotating and driving an information recording medium and a control unit for controlling the optical head and the motor.

According to this construction, since any one of the above optical heads is provided, coma aberration generated due to different positions of emission points of a plurality of laser lights having different wavelengths can be corrected. Further, since the optical disc device comprises any one of the above optical heads, it is possible to provide smaller and more inexpensive computers, optical disc players and optical disc recorders.

An optical head manufacturing method according to still another aspect of the present invention comprises the steps of mounting a light source for emitting a first laser light having a first wavelength and a second laser light having a second wavelength different from the first wavelength in such a manner as to correct coma aberration generated in a radial direction of a first information recording medium in the case of tilting an objective lens to locate an inner peripheral end of the objective lens in the radial direction of the first information recording medium lower than an outer peripheral end thereof; and mounting an objective lens driver for decreasing coma aberration generated by the incidence of the first laser light oblique to the optical axis of the objective lens by tilting the objective lens to locate the inner peripheral end of the objective lens in the radial direction of the first information recording medium lower than the outer peripheral end thereof when the objective lens focuses the first laser light on the information recording layer of the first information recording medium.

According to this construction, the light source is so mounted as to correct the coma aberration generated in the radial direction of the first information recording medium in the case of tilting the objective lens to locate the inner peripheral end of the objective lens in the radial direction of the first information recording medium lower than the outer peripheral end thereof. The objective lens focuses the first laser light on an information recording layer of the first information recording medium and focuses the second laser light on an information recording layer of a second information recording medium different from the first information recording medium. The objective lens driver is mounted to decrease the coma aberration generated by the incidence of the first laser light oblique to the optical axis of the objective lens by tilting the objective lens to locate the inner peripheral end of the objective lens in the radial direction of the first information recording medium lower than the outer peripheral end thereof.

Thus, the coma aberration generated due to the different positions of the emission points of a plurality of laser lights having different wavelengths can be corrected. Further, since the objective lens is tilted to locate the inner peripheral end of the objective lens in the radial direction of the first information recording medium lower than the outer peripheral end thereof, it can correct the coma aberration without coming into contact with a stack ring provided at the inner peripheral side of the first information recording medium.

The optical head and the optical head manufacturing method according to the present invention can satisfactorily record or reproduce information on or from a plurality of types of optical discs. Further, the optical disc device of the present invention can achieve an improvement in productivity and can be inexpensively provided since the construction of the optical head is simplified.

Computers, optical disc players and optical disc recorders provided with the optical disc device of the present invention have an effect of being applicable in a wide range since being able to satisfactorily record or reproduce information on or from different types of optical discs.

This application is based on Japanese Patent Application No. 2007-248637 and No. 2008-242836 filed on Sep. 26, 2007, and Sep. 22, 2008, the contents of which are hereby incorporated by reference.

The present invention has been appropriately and sufficiently described above by way of the embodiments with reference to the drawings, but it should be appreciated that a person skilled in the art can easily modify and/or improve the above embodiments. Accordingly, a modified embodiment or improved embodiment carried out by the person skilled in the art should be interpreted to be embraced by the scope as claimed unless departing from the scope as claimed.

What is claimed is:

1. An optical head, comprising:
 a light source including a first emission point for emitting a first laser light having a first wavelength and a second emission point disposed away from the first emission point by a predetermined distance, and for emitting a second laser light having a second wavelength smaller than the first wavelength;
 a collimator lens for converting the first and second laser lights into substantially parallel lights;
 an objective lens for focusing the first laser light on an information recording layer of a first information recording medium and focusing the second laser light on an information recording layer of a second information recording medium different from the first information recording medium; and
 an objective lens driver for tilting the objective lens in a direction to decrease coma aberration generated by incidence of the first laser light oblique to an optical axis of the objective lens when the objective lens focuses the first laser light on the information recording layer of the first information recording medium,
 wherein the light source is arranged such that an optical axis of the second laser light substantially coincides with that of the objective lens, and such that an optical axis of the first laser light has a predetermined angle with respect to the optical axis of the objective lens,
 the light source is arranged such that the following Equation (1) is satisfied and the first laser light is incident from an outer peripheral side of the first information recording medium relative to the optical axis of the objective lens, if CMD (mλ/°) is a third-order coma aberration amount generated by the tilt of the first information recording medium per unit angle, CML (mλ/°) is a third-order coma aberration amount generated by the tilt of the objective lens per unit angle, δ (mm) is a distance between the first and second emission points of the first and second laser lights and fcl (mm) is the focal length of the collimator lens, and
 the objective lens driver tilts the objective lens to locate the inner peripheral end of the objective lens in the radial direction of the first information recording medium lower than the outer peripheral end thereof when the objective lens focuses the first laser light on an information recording layer of the first information recording medium to thereby correct comma aberration generated in the radial direction of the first information recording medium:

$$1.0 \geqq (CMD+CML) \times \arctan(\delta/fcl)/CML > 0 \quad (1).$$

2. An optical head according to claim 1,
wherein the light source further includes a third emission point which emits a third laser light having a third wavelength different from the first and second wavelengths,
a distance between the third and first emission points of the third and first laser lights is longer than a distance between the third and second emission points of the third and second laser lights, and
the optical axis of the third laser light substantially coincides with that of the objective lens.

3. An optical head according to claim 1,
wherein the light source includes a first light source for emitting the first and second laser lights and a second light source for emitting the third laser light having the third laser light different from the first and second wavelength, and
the optical axis of the third laser light, that of the second laser light and that of the objective lens substantially coincide.

4. An optical head according to claim 3,
wherein the first wavelength is longer than the second wavelength, and
the second wavelength is longer than the third wavelength.

5. An optical head according to claim 1, wherein, in the case of focusing the first laser light on an information recording layer of the first information recording medium, the objective lens satisfies $1.0 \geqq (CMD+CML) \times \alpha/CML$, if CMD (m$\lambda$/°) denotes a third-order coma aberration amount generated by the tilt of the first information recording medium per unit angle, CML (m$\lambda$/°) a third-order coma aberration amount is generated by the tilt of the objective lens per unit angle and $\alpha$ (°) is an angle between the optical axis of the objective lens and that of the first laser light emitted from the light source.

6. An optical head according to claim 1,
wherein coma aberration generated by the incidence of the first laser light oblique to the optical axis of the objective lens includes at least third-order coma aberration and fifth-order coma aberration, and
the objective lens driver tilts the objective lens to substantially zero the third-order coma aberration.

7. An optical head according to claim 1,
wherein coma aberration generated by the incidence of the first laser light oblique to the optical axis of the objective lens includes at least third-order coma aberration and fifth-order coma aberration, and
the objective lens driver tilts the objective lens to make the absolute value of the third-order coma aberration smaller than that of the fifth-order coma aberration.

8. An optical head according to claim 1,
wherein coma aberration generated by the incidence of the first laser light oblique to the optical axis of the objective lens includes at least third-order coma aberration and fifth-order coma aberration, and
the objective lens driver tilts the objective lens to make the absolute value of the third-order coma aberration substantially equal to that of the fifth-order coma aberration.

9. An optical head according to claim 1, further comprising:
a disc discriminator for discriminating the type of an unknown information recording medium,
wherein the disc discriminator discriminates whether or not the unknown information recording medium to have information recorded thereon or reproduced therefrom is the second information recording medium with the tilt of the objective lens substantially set to zero.

10. An optical head according to claim 1, further comprising:
a disc discriminator for discriminating the type of an unknown information recording medium,
wherein the disc discriminator discriminates whether or not the unknown information recording medium to have information recorded thereon or reproduced therefrom is the first information recording medium after changing the tilt of the objective lens in a direction to maximally decrease coma aberration generated by the incidence of the first laser light oblique to the optical axis of the objective lens.

11. An optical head according to claim 1, further comprising:
a disc discriminator for discriminating the type of an unknown information recording medium,
wherein the disc discriminator discriminates the type of the unknown information recording medium to have information recorded thereon or reproduced therefrom after changing the tilt of the objective lens in a direction to decrease coma aberration generated by the incidence of the first laser light oblique to the optical axis of the objective lens.

12. An optical disc device, comprising:
an optical head according to claim 1;
a motor for rotating and driving an information recording medium; and
a control unit for controlling the optical head and the motor.

13. An optical head comprising:
a light source including a first emission point for emitting a first laser light having a first wavelength and a second emission point disposed away from the first emission point by a predetermined distance, and for emitting a second laser light having a second wavelength smaller than the first wavelength;
a collimator lens for converting the first and second laser lights into substantially parallel lights;
an objective lens for focusing the first laser light on an information recording layer of a first information recording medium and focusing the second laser light on an information recording layer of a second information recording medium different from the first information recording medium; and
an objective lens driver for tilting the objective lens in a direction to decrease coma aberration generated by incidence of the first laser light oblique to an optical axis of the objective lens when the objective lens focuses the first laser light on the information recording layer of the first information recording medium,
wherein the light source is arranged such that an optical axis of the second laser light substantially coincides with that of the objective lens, and such that an optical axis of the first laser light has a predetermined angle with respect to the optical axis of the objective lens,
the light source is arranged such that the following Equations (2) and (3) are satisfied and the first laser light is incident form an inner peripheral side of the first information recording medium relative to the objective lens, if CMD) (m$\lambda$/°) is a third-order coma aberration amount generated by the tilt of the first information recording medium per unit angle, CML (m$\lambda$/°) is a third-order coma aberration amount generated by the tilt of the objective lens per unit angle, δ (mm) is a distance between the first and second emission points of the first and second laser lights and fcl (mm) is the focal length of the collimator lens, and the objective lens driver tilts the objective lens to locate the inner peripheral end of the objective lens in the radial direction of the first information recording medium lower than the outer peripheral end thereof when the objective lens focuses the first laser light on an information recording layer of the first information recording medium to thereby correct comma aberration generated in the radial direction of the first information recording medium:

$$(CMD+CML) \times \arctan(\delta/fcl)/CML \geq 1.0 \quad (2)$$

$$(CMD+CML) \times \arctan(\delta/fcl) \geq 10 \quad (3).$$

14. An optical head according to claim 13,
wherein the light source further includes a third emission point which emits a third laser light having a third wavelength different from the first and second wavelengths,
a distance between the third and first emission points of the third and first laser lights is longer than a distance between the third and second emission points of the third and second laser lights, and
the optical axis of the third laser light substantially coincides with that of the objective lens.

15. An optical head according to claim 13,
wherein the light source includes a first light source for emitting the first and second laser lights and a second light source for emitting the third laser light having the third laser light different from the first and second wavelength, and
the optical axis of the third laser light, that of the second laser light and that of the objective lens substantially coincide.

16. An optical head according to claim 15,
wherein the first wavelength is longer than the second wavelength, and
the second wavelength is longer than the third wavelength.

17. An optical head according to claim 13, wherein, in the case of focusing the first laser light on an information recording layer of the first information recording medium, the objective lens satisfies $1.0 \geq (CMD+CML) \times \alpha/CML$, if CMD (mλ/°) denotes a third-order coma aberration amount generated by the tilt of the first information recording medium per unit angle, CML (mλ/°) a third-order coma aberration amount is generated by the tilt of the objective lens per unit angle and α (°) is an angle between the optical axis of the objective lens and that of the first laser light emitted from the light source.

18. An optical head according to claim 13,
wherein coma aberration generated by the incidence of the first laser light oblique to the optical axis of the objective lens includes at least third-order coma aberration and fifth-order coma aberration, and
the objective lens driver tilts the objective lens to substantially zero the third-order coma aberration.

19. An optical head according to claim 13,
wherein coma aberration generated by the incidence of the first laser light oblique to the optical axis of the objective lens includes at least third-order coma aberration and fifth-order coma aberration, and
the objective lens driver tilts the objective lens to make the absolute value of the third-order coma aberration smaller than that of the fifth-order coma aberration.

20. An optical head according to claim 13,
wherein coma aberration generated by the incidence of the first laser light oblique to the optical axis of the objective lens includes at least third-order coma aberration and fifth-order coma aberration, and
the objective lens driver tilts the objective lens to make the absolute value of the third-order coma aberration substantially equal to that of the fifth-order coma aberration.

21. An optical head according to claim 13, further comprising:
a disc discriminator for discriminating the type of an unknown information recording medium,
wherein the disc discriminator discriminates whether or not the unknown information recording medium to have information recorded thereon or reproduced therefrom is the second information recording medium with the tilt of the objective lens substantially set to zero.

22. An optical head according to claim 13, further comprising:
a disc discriminator for discriminating the type of an unknown information recording medium,
wherein the disc discriminator discriminates whether or not the unknown information recording medium to have information recorded thereon or reproduced therefrom is the first information recording medium after changing the tilt of the objective lens in a direction to maximally decrease coma aberration generated by the incidence of the first laser light oblique to the optical axis of the objective lens.

23. An optical head according to claim 13, further comprising:
a disc discriminator for discriminating the type of an unknown information recording medium,
wherein the disc discriminator discriminates the type of the unknown information recording medium to have information recorded thereon or reproduced therefrom after changing the tilt of the objective lens in a direction to decrease coma aberration generated by the incidence of the first laser light oblique to the optical axis of the objective lens.

24. An optical disc device, comprising:
an optical head according to claim 13;
a motor for rotating and driving an information recording medium; and
a control unit for controlling the optical head and the motor.

25. An optical head, comprising:
a light source including a first emission point for emitting a first laser light having a first wavelength, a second emission point disposed away from the first emission point by a predetermined distance, and for emitting a second laser light having a second wavelength different from the first wavelength, and a third emission point disposed away from the first and second emission points by a predetermined distance, and for emitting a third laser light having a third wavelength smaller than the first and second wavelengths;
a collimator lens for converting the first and second laser lights into substantially parallel lights;
an objective lens for focusing the first laser light on an information recording layer of a first information recording medium and focusing the second laser light on an information recording layer of a second information recording medium different from the first information recording medium; and
an objective lens driver for tilting the objective lens in a direction to decrease coma aberration generated by the incidence of the first laser light oblique to the optical axis of the objective lens when the objective lens focuses the first laser light on the information recording layer of the first information recording medium, wherein the light source is arranged such that an optical axis of the second laser light has a predetermined angle with respect to the optical axis of the objective lens, and such that an optical axis of the first laser light has a predetermined angle with respect to the optical axis of the objective lens, the light source is arranged such that the following Equation (4) is satisfied and the first laser light is incident from an outer peripheral side of the first information recording medium relative to the optical axis of the objective lens, if CMD1 (m$\lambda$/°) is a third-order coma aberration amount generated by the tilt of the first information recording medium per unit angle, CML1 (m$\lambda$/°) is a third-order coma aberration amount generated by the tilt of the objective lens per unit angle at the time of recording or reproducing information on or from the first information recording medium, CMD2 (m$\lambda$/°) is a third-order coma aberration amount generated by the tilt of the second information recording medium per unit angle, CML2 (m$\lambda$/°) is a third-order coma aberration amount generated by the tilt of the objective lens per unit angle at the time of recording or reproducing information on or from the second information recording medium, $\delta a$ (mm) is a distance between the third and first emission points of the third and first laser lights in the light source, $\delta b$ (mm) is a distance between the third and second emission points of the third and second laser lights in the light source and fcl (mm) is the focal length of the collimator lens, the objective lens driver tilts the objective lens to locate the inner peripheral end of the objective lens in the radial direction of the first information recording medium lower than the outer peripheral end thereof when the objective lens focuses the first laser light on the information recording layer of the first information recording medium to thereby correct comma aberration generated in the radial direction of the first information recording medium, the light source is arranged such that the following Equations (5) and (6) are satisfied and the second laser light is incident form an inner peripheral side of the second information recording medium relative to the optical axis of the objective lens, and the objective lens driver tilts the objective lens to locate the inner peripheral end of the objective lens in the radial direction of the second information recording medium lower than the outer peripheral end thereof when the objective lens focuses the second laser light on the information recording layer of the second information recording medium to thereby correct comma aberration generated in the radial direction of the second information recording medium:

$$1.0 \geq (CMD1+CML1) \times \arctan(\delta a/fcl)/CML1 > 0 \quad (4)$$

$$(CMD2+CML2) \times \arctan(\delta b/fcl)/CML2 \geq -1.0 \quad (5)$$

$$(CMD2+CML2) \times \arctan(\delta b/fcl) \geq 10 \quad (6).$$

26. An optical head according to claim 25,
wherein the third emission point of the third laser light is arranged between the first and second emission points of the first and second laser lights, and
the optical axis of the third laser light substantially coincides with that of the objective lens.

27. An optical head manufacturing method, comprising the steps of:
mounting a light source including a first emission point for emitting a first laser light having a first wavelength and a second emission point disposed away from the first emission point by a predetermined distance, and for emitting a second laser light having a second wavelength smaller than the first wavelength in such a manner as to correct coma aberration generated in a radial direction of a first information recording medium in the case of tilting an objective lens to locate an inner peripheral end of the objective lens in the radial direction of the first information recording medium lower than an outer peripheral end thereof;
mounting a collimator lens for converting the first and second laser lights into substantially parallel lights; and
mounting an objective lens driver for decreasing coma aberration generated by the incidence of the first laser light oblique to the optical axis of the objective lens by tilting the objective lens to locate the inner peripheral end of the objective lens in the radial direction of the first information recording medium lower than the outer peripheral end thereof when the objective lens focuses the first laser light on the information recording layer of the first information recording medium,
wherein the light source is arranged such that an optical axis of the second laser light substantially coincides with that of the objective lens, and such that an optical axis of the first laser light has a predetermined angle with respect to the optical axis of the objective lens,
the light source is arranged such that the following Equation (7) is satisfied and the first laser light is incident from an outer peripheral side of the first information recording medium relative to the optical axis of the objective lens, if CMD (m$\lambda$/°) is a third-order coma aberration amount generated by the tilt of the first information recording medium per unit angle, CML (m$\lambda$/°) is a third-order coma aberration amount generated by the tilt of the objective lens per unit angle, $\delta$ (mm) is a distance between the first and second emission points of the first and second laser lights and fcl (mm) is the focal length of the collimator lens, and
the objective lens driver tilts the objective lens to locate the inner peripheral end of the objective lens in the radial direction of the first information recording medium lower than the outer peripheral end thereof when the objective lens focuses the first laser light on an information recording layer of the first information recording medium to thereby correct comma aberration generated in the radial direction of the first information recording medium:

$$1.0 \geq (CMD+CML) \times \arctan(\delta/fcl)/CML > 0 \quad (7).$$

28. An optical head manufacturing method, comprising the steps of:
mounting a light source including a first emission point for emitting a first laser light having a first wavelength and a second emission point disposed away from the first emission point by a predetermined distance, and for emitting a second laser light having a second wavelength smaller than the first wavelength in such a manner as to correct coma aberration generated in a radial direction of a first information recording medium in the case of tilting an objective lens to locate an inner peripheral end of the objective lens in the radial direction of the first information recording medium lower than an outer peripheral end thereof;

mounting a collimator lens for converting the first and second laser lights into substantially parallel lights; and mounting an objective lens driver for decreasing coma aberration generated by the incidence of the first laser light oblique to the optical axis of the objective lens by tilting the objective lens to locate the inner peripheral end of the objective lens in the radial direction of the first information recording medium lower than the outer peripheral end thereof when the objective lens focuses the first laser light on the information recording layer of the first information recording medium, wherein the light source is arranged such that an optical axis of the second laser light substantially coincides with that of the objective lens, and such that an optical axis of the first laser light has a predetermined angle with respect to the optical axis of the objective lens, the light source is arranged such that the following Equations (8) and (9) are satisfied and the first laser light is incident from an inner peripheral side of the first information recording medium relative to the optical axis of the objective lens, if CMD (m$\lambda$/°) is a third-order coma aberration amount generated by the tilt of the first information recording medium per unit angle, CML (m$\lambda$/°) is a third-order coma aberration amount generated by the tilt of the objective lens per unit angle, $\delta$ (mm) is a distance between the first and second emission points of the first and second laser lights in the light source, and fcl (mm) is the focal length of the collimator lens, and the objective lens driver tilts the objective lens to locate the inner peripheral end of the objective lens in the radial direction of the first information recording medium lower than the outer peripheral end thereof when the objective lens focuses the first laser light on an information recording layer of the first information recording medium to thereby correct comma aberration generated in the radial direction of the first information recording medium:

$$(CMD+CML) \times \arctan(\delta/fcl)/CML \geq -1.0 \qquad (8)$$

$$(CMD+CML) \times \arctan(\delta/fcl) \geq 10 \qquad (9).$$

* * * * *

UNITED STATES PATENT AND TRADEMARK OFFICE
CERTIFICATE OF CORRECTION

PATENT NO. : 8,300,513 B2
APPLICATION NO. : 12/238888
DATED : October 30, 2012
INVENTOR(S) : Yamasaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 595 days.

Signed and Sealed this
Fifth Day of March, 2013

Teresa Stanek Rea
*Acting Director of the United States Patent and Trademark Office*